United States Patent
Vargas et al.

(10) Patent No.: US 11,540,106 B2
(45) Date of Patent: Dec. 27, 2022

(54) BEAM SWEEPING ON MILLIMETER WAVE FREQUENCIES FOR DEVICE-TO-DEVICE COMMUNICATIONS

(71) Applicant: QUALCOMM Incorporated, San Diego, CA (US)

(72) Inventors: Jose Edson Vargas, San Diego, CA (US); Kapil Gulati, Hillsborough, NJ (US); Junyi Li, Chester, NJ (US); Zhibin Wu, Los Altos, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/824,664

(22) Filed: Mar. 19, 2020

(65) Prior Publication Data

US 2020/0322774 A1    Oct. 8, 2020

Related U.S. Application Data

(60) Provisional application No. 62/830,240, filed on Apr. 5, 2019.

(51) Int. Cl.
*H04W 8/00* (2009.01)
*H04W 16/28* (2009.01)
(Continued)

(52) U.S. Cl.
CPC .......... *H04W 8/005* (2013.01); *H04W 4/029* (2018.02); *H04W 4/70* (2018.02); *H04W 16/28* (2013.01);
(Continued)

(58) Field of Classification Search
CPC ....... H04W 4/029; H04W 4/70; H04W 8/005; H04W 16/28; H04W 28/0268;
(Continued)

(56) References Cited

U.S. PATENT DOCUMENTS 10,771,961 B2   9/2020   Lee et al.
11,102,839 B2   8/2021   Wu et al.
(Continued)

FOREIGN PATENT DOCUMENTS

GB          2548374 A      9/2017
KR     20170093071 A      8/2017
(Continued)

OTHER PUBLICATIONS

International Search Report and Written Opinion—PCT/US2020/023999—ISA/EPO—dated Jul. 3, 2020.
(Continued)

*Primary Examiner* — Congvan Tran
(74) *Attorney, Agent, or Firm* — Qualcomm Incorporated

(57) ABSTRACT

Disclosed are techniques for wireless communication. In an aspect, a first user equipment (UE) performs a limited beam sweep of one or more transmit beams on a second frequency band in an estimated direction from the first UE to the second UE, wherein the estimated direction is based on one or more parameters received over a previously established signaling radio bearer (SRB) on a first frequency band and/or a device-to-device discovery procedure performed on the first frequency band, receives, over the SRB, a confirmation that a data radio bearer (DRB) has been established on the second frequency band with at least one transmit beam of the one or more transmit beams, and sends, to the second UE, a data flow over the DRB on the second frequency band using the at least one transmit beam.

48 Claims, 17 Drawing Sheets

(51) Int. Cl.
| | |
|---|---|
| *H04W 4/029* | (2018.01) |
| *H04W 28/02* | (2009.01) |
| *H04W 80/02* | (2009.01) |
| *H04W 4/70* | (2018.01) |
| *H04W 72/04* | (2009.01) |
| *H04W 74/08* | (2009.01) |
| *H04W 92/18* | (2009.01) |

(52) U.S. Cl.
CPC ..... *H04W 28/0268* (2013.01); *H04W 72/046* (2013.01); *H04W 72/0453* (2013.01); *H04W 74/0833* (2013.01); *H04W 80/02* (2013.01); *H04W 92/18* (2013.01)

(58) Field of Classification Search
CPC ........... H04W 72/0453; H04W 72/046; H04W 74/0833; H04W 92/18
USPC .................................................. 370/328–329
See application file for complete search history.

(56) References Cited

U.S. PATENT DOCUMENTS

| | | | |
|---|---|---|---|
| 2012/0250601 A1 | 10/2012 | Choi et al. | |
| 2014/0295868 A1 | 10/2014 | Lee | |
| 2016/0135220 A1 | 5/2016 | Jha et al. | |
| 2017/0118766 A1 | 4/2017 | Baek et al. | |
| 2017/0181206 A1* | 6/2017 | Lee | H04W 76/32 |
| 2018/0132304 A1* | 5/2018 | Lee | H04W 76/30 |
| 2018/0279134 A1 | 9/2018 | Malik et al. | |
| 2018/0310305 A1 | 10/2018 | Shao et al. | |
| 2019/0037461 A1* | 1/2019 | Li | H04W 76/23 |
| 2019/0097712 A1* | 3/2019 | Singh | H04B 7/04 |
| 2019/0349730 A1 | 11/2019 | Kim et al. | |
| 2019/0379441 A1* | 12/2019 | Priyanto | H04W 8/22 |
| 2020/0092685 A1* | 3/2020 | Fehrenbach | H04W 4/46 |
| 2020/0146048 A1 | 5/2020 | Lee et al. | |
| 2020/0229007 A1 | 7/2020 | Jung et al. | |
| 2020/0267790 A1 | 8/2020 | Kim et al. | |
| 2020/0323019 A1 | 10/2020 | Vargas et al. | |
| 2021/0045103 A1* | 2/2021 | Kim | H04W 24/02 |
| 2021/0099847 A1* | 4/2021 | Uchiyama | H04W 4/40 |
| 2021/0168862 A1* | 6/2021 | Murray | H04W 74/002 |
| 2021/0321267 A1* | 10/2021 | Kim | H04B 7/0408 |
| 2021/0329730 A1 | 10/2021 | Wu et al. | |

FOREIGN PATENT DOCUMENTS

| | | |
|---|---|---|
| WO | WO-2013162193 A1 | 10/2013 |
| WO | WO-2017099833 A1 | 6/2017 |
| WO | 2019036578 A1 | 2/2019 |

OTHER PUBLICATIONS

CATT: "Discussion on Unicast Connection Setup Procedure", 3GPP TSG-RAN WG2 Meeting #107, 3GPP Draft; R2-1908737, 3rd Generation Partnership Project (3GPP), Mobile Competence Centre, 650, Route Des Lucioles, F-06921 Sophia-Antipolis Cedex, France, vol. RAN WG2. No. Prague, Czech Republic; Aug. 26-30, 2019, Aug. 16, 2019 (Aug. 16, 2019), 9 Pages, XP051766559, Retrieved from the Internet: URL: http://www.3gpp.org/ftp/tsg_ran/WG2_RL2/TSGR2_107/Docs/R2-1908737.zip, [retrieved on Aug. 16, 2019], Sections 1.-4., Appendices A, B.

Huawei, et al., "Beamforming for V2X Sidelink for FR1 and FR2", 3GPP Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25-Mar. 1, 2019, Feb. 15, 2019 (Feb. 15, 2019), XP051600771, 4 Pages, Retrieved from the Internet: URL: http://www.3gpp.org/ftp/tsg%5Fran/WG1%5FRL1/TSGR1%5F96/Docs/R1%2D1903075%2Ezip [retrieved on Feb. 15, 2019] p. 1, line 1—p. 3, line 13.

Huawei, et al., "Further Views on Rel-17 Work Area on NR Sidelink Enhancements for V2X and other Use Cases", 3GPP Draft, 3GPP TSG RAN Meeting #85, RP-191831, 3rd Generation Partnership Project (3GPP), Mobile Competence Centre, 650, Route Des Lucioles, F-06921 Sophia-Antipolis Cedex, France, vol. TSG RAN No. Newport Beach USA, Sep. 16-20, 2019, Sep. 9, 2019 (Sep. 9, 2019), XP051782380, 13 Pages, Retrieved from the Internet: URL: http://www.3gpp.org/ftp/tsg_ran/TSG_RAN/TSGR_85/Docs/RP-191831.zip [retrieved on Sep. 9, 2019], p. 5, paragraph 2.1.2.3, Section 2.2.2, figure 9.

LG Electronics: "Summary of Email Discussion on Rel-17 Sidelink Enhancement", 3GPP TSG RAN #86, 3GPP Draft; RP-192745, 3rd Generation Partnership Project (3GPP), Mobile Competence Centre, 650, Route Des Lucioles, F-06921 Sophia-Antipolis Cedex, France, vol. TSG RAN. No. Sitges, ES, Dec. 9-12, 2019, Dec. 2, 2019 (Dec. 2, 2019), 27 Pages, XP051834348, Retrieved from the Internet: URL:https://ftp.3gpp.org/tsg_ran/TSG_RAN/TSGR_86/Docs/RP-192745.zip, RP-192745 Email discussion on sidelink enhancement.doc [retrieved on Dec. 2, 2019], abstract p. 11-14, the whole document.

VIVO: "Consideration on PC5 L3 Protocol Design", 3GPP TSG-RAN WG2 Meeting #103bis, 3GPP Draft; R2-1813923 Consideration On PC5 L3 Protocol Design, 3rd Generation Partnership Project (3GPP), Mobile Competence Centre, 650, Route Des Lucioles ; F-06921 Sophia-Antipolis Cedex, France, vol. RAN WG2, No. Chengdu, CN; Oct. 8-12, 2018, Sep. 28, 2018 (Sep. 28, 2018), 3 Pages, XP051523393, Retrieved from the Internet: URL: http://www.3gpp.org/ftp/tsg%5Fran/WG2%5FRL2/TSGR2%5F103bis/Docs/R2%2D1813923%2Ezip [retrieved on Sep. 28, 2018], Sections 1.-3.

\* cited by examiner

BEAM SWEEPING ON MILLIMETER WAVE FREQUENCIES FOR DEVICE-TO-DEVICE COMMUNICATIONS

CROSS-REFERENCE TO RELATED APPLICATIONS

The present application for patent claims the benefit of U.S. Provisional Application No. 62/830,240, entitled "ESTABLISHING RADIO BEARERS ON MILLIMETER WAVE FREQUENCIES FOR DEVICE-TO-DEVICE COMMUNICATIONS," filed Apr. 5, 2019, assigned to the assignee hereof, and expressly incorporated herein by reference in its entirety.

INTRODUCTION

Various aspects described herein generally relate to wireless communication systems, and more specifically to device-to-device communications over sidelink.

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the global system for mobile access (GSM) variation of TDMA, etc.

A fifth generation (5G) wireless standard, referred to as New Radio (NR), enables higher data transfer speeds, greater numbers of connections, and better coverage, among other improvements. The NR standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of NR mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In an aspect, a method for wireless communication performed at a first UE includes receiving one or more parameters during a sidelink discovery procedure performed with a second UE on a first frequency band, the one or more parameters including a location of the second UE, and beam sweeping one or more transmit beams on a second frequency band in a direction of the second UE, wherein the direction is based on the location of the second UE.

In an aspect, a method for wireless communication performed at a second UE includes receiving one or more parameters during a sidelink discovery procedure performed with a first UE on a first frequency band, the one or more parameters including a location of the first UE, beam sweeping one or more receive beams on a second frequency band in a direction of the first UE, wherein the direction is based on the location of the first UE, and determining at least one receive beam of the one or more receive beams to receive at least one transmit beam from the first UE on the second frequency band.

In an aspect, a method for wireless communication performed at a first UE includes receiving one or more parameters over a signaling radio bearer (SRB) established with a second UE on a first frequency band, the one or more parameters including a location of the second UE, and beam sweeping one or more transmit beams on a second frequency band in a direction of the second UE, wherein the direction is based on the location of the second UE.

In an aspect, a method for wireless communication performed at a second UE includes receiving one or more parameters over a SRB established with a first UE on a first frequency band, the one or more parameters including a location of the first UE, beam sweeping one or more receive beams on a second frequency band in a direction of the first UE, wherein the direction is based on the location of the first UE, and determining at least one receive beam of the one or more receive beams to receive at least one transmit beam from the first UE on the second frequency band.

In an aspect, a first UE includes a memory and at least one processor coupled to the memory, the memory and the at least one processor configured to receive one or more parameters during a sidelink discovery procedure performed with a second UE on a first frequency band, the one or more parameters including a location of the second UE, and beam sweep one or more transmit beams on a second frequency band in a direction of the second UE, wherein the direction is based on the location of the second UE.

In an aspect, a second UE includes a memory and at least one processor coupled to the memory, the memory and the at least one processor configured to receive one or more parameters during a sidelink discovery procedure performed with a first UE on a first frequency band, the one or more parameters including a location of the first UE, beam sweep one or more receive beams on a second frequency band in a direction of the first UE, wherein the direction is based on the location of the first UE, and to determine at least one receive beam of the one or more receive beams to receive at least one transmit beam from the first UE on the second frequency band.

In an aspect, a first UE includes a memory and at least one processor coupled to the memory, the memory and the at least one processor configured to receive one or more parameters over an SRB established with a second UE on a first frequency band, the one or more parameters including a location of the second UE, and beam sweep one or more transmit beams on a second frequency band in a direction of the second UE, wherein the direction is based on the location of the second UE.

In an aspect, a first UE includes a memory and at least one processor coupled to the memory, the memory and the at least one processor configured to receive one or more parameters over a SRB established with a first UE on a first frequency band, the one or more parameters including a location of the first UE, beam sweep one or more receive beams on a second frequency band in a direction of the first UE, wherein the direction is based on the location of the first UE, and determine at least one receive beam of the one or more receive beams to receive at least one transmit beam from the first UE on the second frequency band.

In an aspect, a first UE includes means for receiving one or more parameters during a sidelink discovery procedure performed with a second UE on a first frequency band, the one or more parameters including a location of the second UE, and means for beam sweeping one or more transmit beams on a second frequency band in a direction of the second UE, wherein the direction is based on the location of the second UE.

In an aspect, a second UE includes means for receiving one or more parameters during a sidelink discovery procedure performed with a first UE on a first frequency band, the one or more parameters including a location of the first UE, means for beam sweeping one or more receive beams on a second frequency band in a direction of the first UE, wherein the direction is based on the location of the first UE, and means for determining at least one receive beam of the one or more receive beams to receive at least one transmit beam from the first UE on the second frequency band.

In an aspect, a first UE includes means for receiving one or more parameters over an SRB established with a second UE on a first frequency band, the one or more parameters including a location of the second UE, and means for beam sweeping one or more transmit beams on a second frequency band in a direction of the second UE, wherein the direction is based on the location of the second UE.

In an aspect, a second UE includes means for receiving one or more parameters over a SRB established with a first UE on a first frequency band, the one or more parameters including a location of the first UE, means for beam sweeping one or more receive beams on a second frequency band in a direction of the first UE, wherein the direction is based on the location of the first UE, and means for determining at least one receive beam of the one or more receive beams to receive at least one transmit beam from the first UE on the second frequency band.

In an aspect, a non-transitory computer-readable medium storing computer-executable instructions includes computer-executable instructions comprising at least one instruction instructing a first UE to receive one or more parameters during a sidelink discovery procedure performed with a second UE on a first frequency band, the one or more parameters including a location of the second UE, and at least one instruction instructing the first UE to beam sweep one or more transmit beams on a second frequency band in a direction of the second UE, wherein the direction is based on the location of the second UE.

In an aspect, a non-transitory computer-readable medium storing computer-executable instructions includes computer-executable instructions comprising at least one instruction instructing a second UE to receive one or more parameters during a sidelink discovery procedure performed with a first UE on a first frequency band, the one or more parameters including a location of the first UE, at least one instruction instructing the second UE to beam sweep one or more receive beams on a second frequency band in a direction of the first UE, wherein the direction is based on the location of the first UE, and at least one instruction instructing the second UE to determine at least one receive beam of the one or more receive beams to receive at least one transmit beam from the first UE on the second frequency band.

In an aspect, a non-transitory computer-readable medium storing computer-executable instructions includes computer-executable instructions comprising at least one instruction instructing a first UE to receive one or more parameters over an SRB established with a second UE on a first frequency band, the one or more parameters including a location of the second UE, and at least one instruction instructing the first UE to beam sweep one or more transmit beams on a second frequency band in a direction of the second UE, wherein the direction is based on the location of the second UE.

In an aspect, a non-transitory computer-readable medium storing computer-executable instructions includes computer-executable instructions comprising at least one instruction instructing a second UE to receive one or more parameters over a SRB established with a first UE on a first frequency band, the one or more parameters including a location of the first UE, at least one instruction instructing the second UE to beam sweep one or more receive beams on a second frequency band in a direction of the first UE, wherein the direction is based on the location of the first UE, and at least one instruction instructing the second UE to determine at least one receive beam of the one or more receive beams to receive at least one transmit beam from the first UE on the second frequency band.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
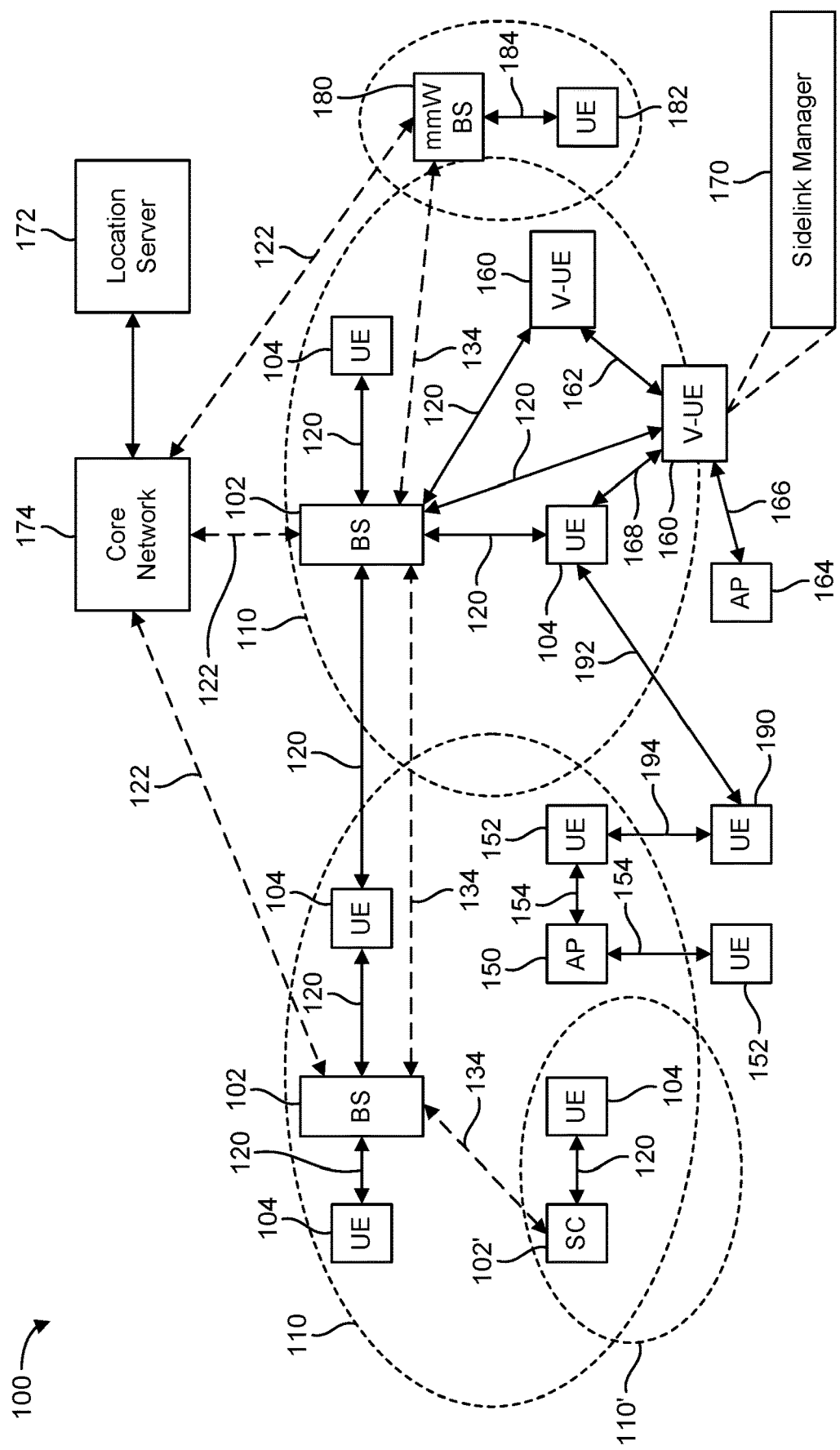
FIG. 1 illustrates an exemplary wireless communications system in accordance with one or more aspects of the disclosure.

Disclosed are techniques for establishing a device-to-device unicast sidelink between an initiator device and a target device in a millimeter wave (mmW) frequency band. In an aspect, the devices may obtain connection setup parameters for the mmW unicast sidelink from a previously established non-mmW link between the devices or between at least one of the devices and a base station. The connection setup parameters may include the locations of the devices, a requested quality of service (QoS) for the mmW unicast sidelink, the number of transmit beams used by the initiator device for the mmW unicast sidelink, periodicity of the transmit beams, and the beam response and/or physical random access channel (PRACH) configuration for the transmit beams. By using the previously established non-mmW link to obtain the connection setup parameters for the mmW unicast sidelink, beam pair link (BPL) acquisition and resource utilization are sped up in the for the mmW unicast sidelink. Once the mmW unicast sidelink is established from the initiator device to the target device, the initiator device can transmit data to the target device over the mmW unicast link. In addition, if desired, the target device can transmit data to the initiator device with support of, for example, reflective QoS.

These and other aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station.

Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or next generation core (NGC)) through backhaul links 122, and through the core network 174 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINK), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless unicast sidelink 162, with a roadside access point 164 over a sidelink 166, or with UEs 104 over a sidelink 168 using P2P/D2D protocols (e.g., "PC5," an LTE V2X D2D interface) or ProSe direct communications. Sidelink communication may be used for D2D media-sharing, V2V communication, V2X communication (e.g., cellular V2X (cV2X) communication, enhanced V2X (eV2X) communication, etc.), emergency rescue applications, etc. One or more of a group of V-UEs 160 utilizing D2D communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via D2D communications may utilize a one-to-many (1:M) system in which each V-UE 160 transmits to every other V-UE 160 in the group. In some cases, a base station 102 facilitates the scheduling of resources for D2D communications. In other cases, D2D communications are carried out between V-UEs 160 without the involvement of a base station 102.

In an aspect, the V-UEs 160, and any other UE illustrated in FIG. 1, may have a sidelink manager 170. The sidelink manager 170 may be a hardware, software, or firmware component that, when executed, causes the V-UE 160 to perform the operations described herein. For example, the sidelink manager 170 may be a software module stored in a memory of the V-UE 160 and executable by a processor of the V-UE 160. As another example, the sidelink manager 170 may be a hardware circuit (e.g., an ASIC, a field programmable gate array (FPGA), etc.) within the V-UE 160. Note that although only one UE (V-UE 160) is illustrated as including a sidelink manager 170, any of the illustrated UEs may include a sidelink manager 170.

In an aspect, the sidelinks 162, 166, 168 may operate over a communication medium of interest, which may be shared with other communications between other vehicles and/or infrastructure access points, as well as other RATs. A "medium" may be composed of one or more frequency, time, and/or space communication resources (e.g., encompassing one or more channels across one or more carriers) associated with communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

Figure 2A:
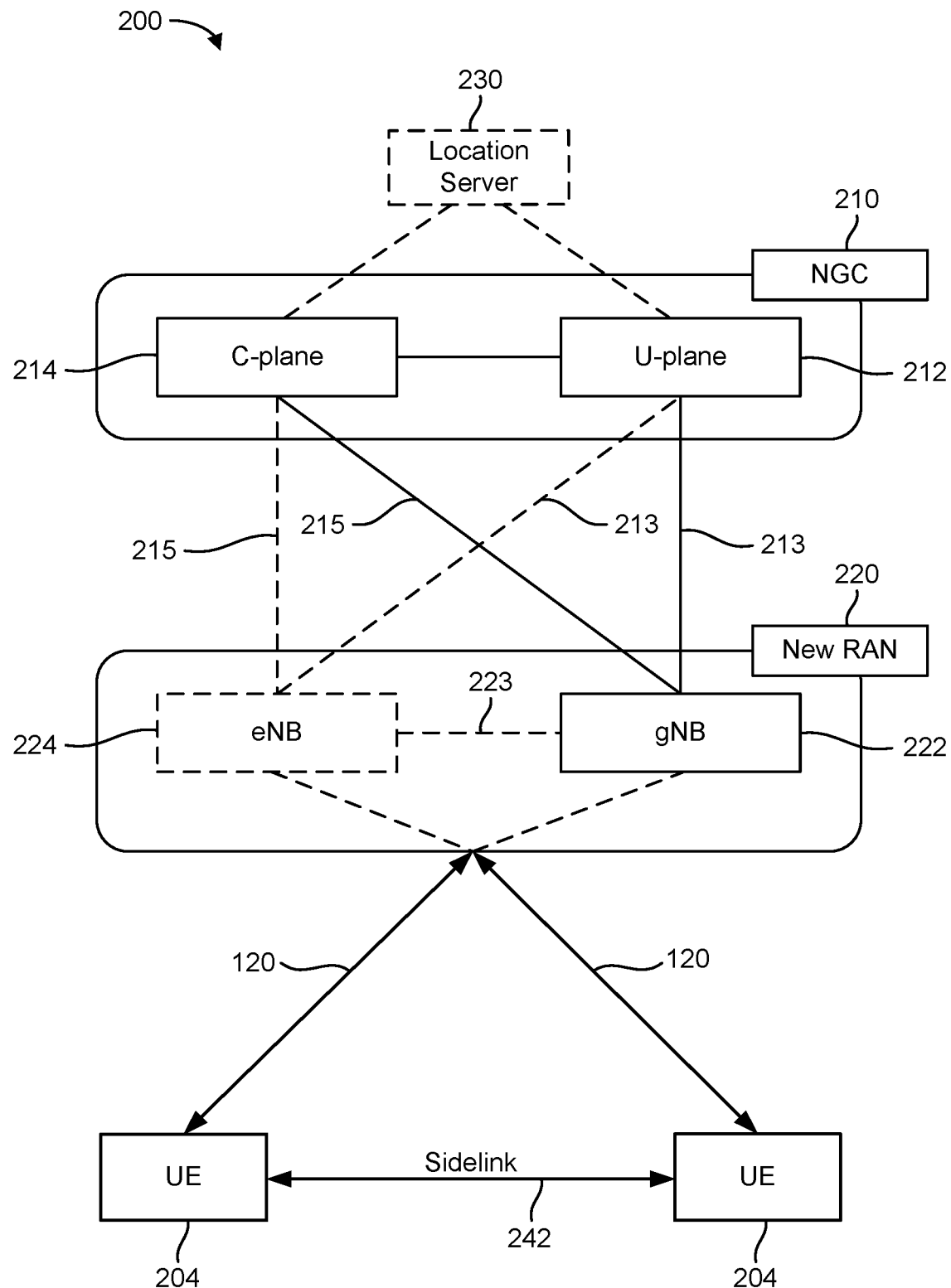
FIGS. 2A and 2B illustrate example wireless network structures, according to various aspects.

According to various aspects, FIG. 2A illustrates an exemplary wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). In an aspect, two UEs 204 may communicate with each other over a wireless unicast sidelink 242, which may correspond to wireless unicast sidelink 162 in FIG. 1.

Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
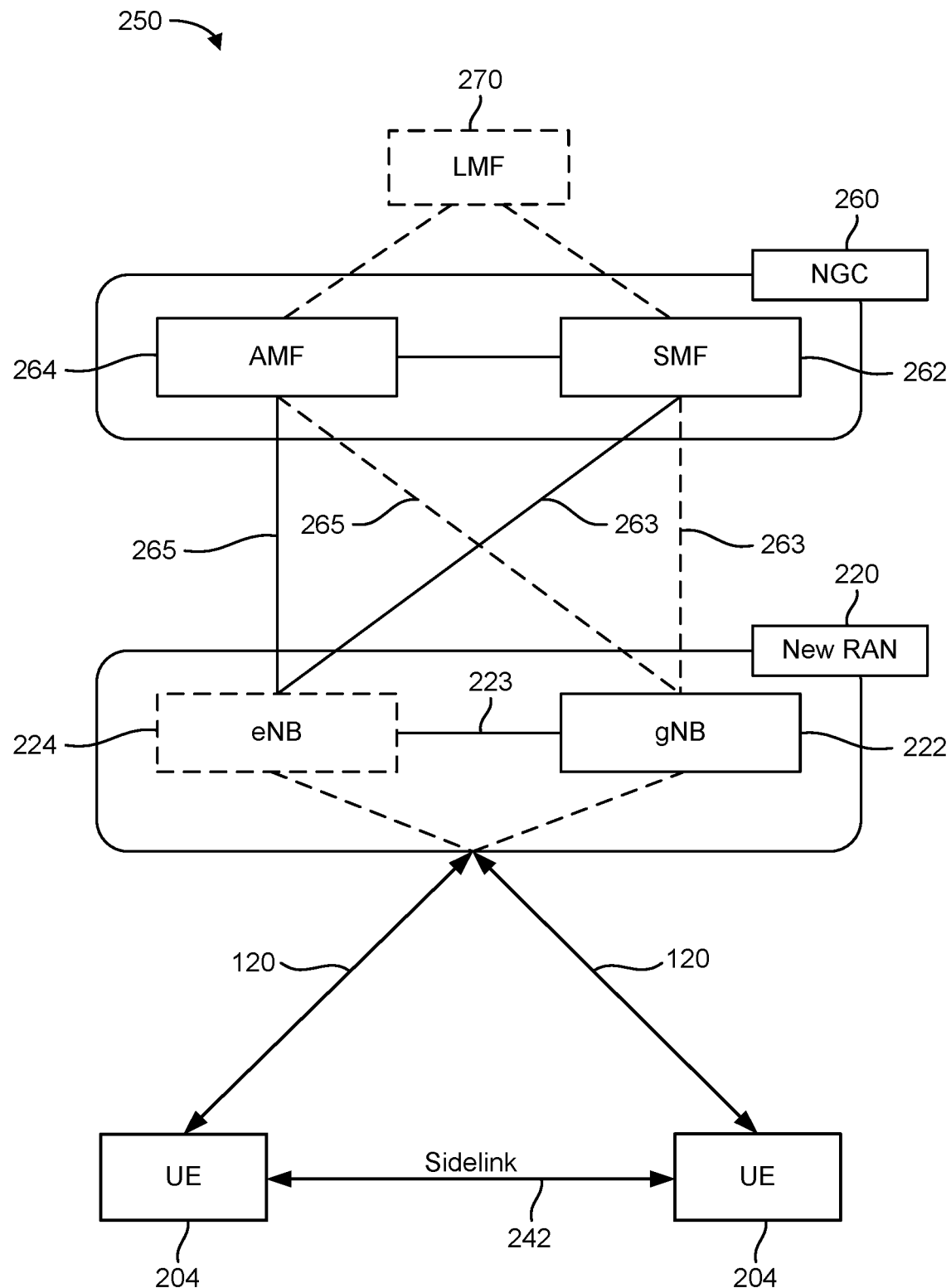

According to various aspects, FIG. 2B illustrates another exemplary wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface. In an aspect, two UEs 204 may communicate with each other over a wireless unicast sidelink 242, which may correspond to wireless unicast sidelink 162 in FIG. 1.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
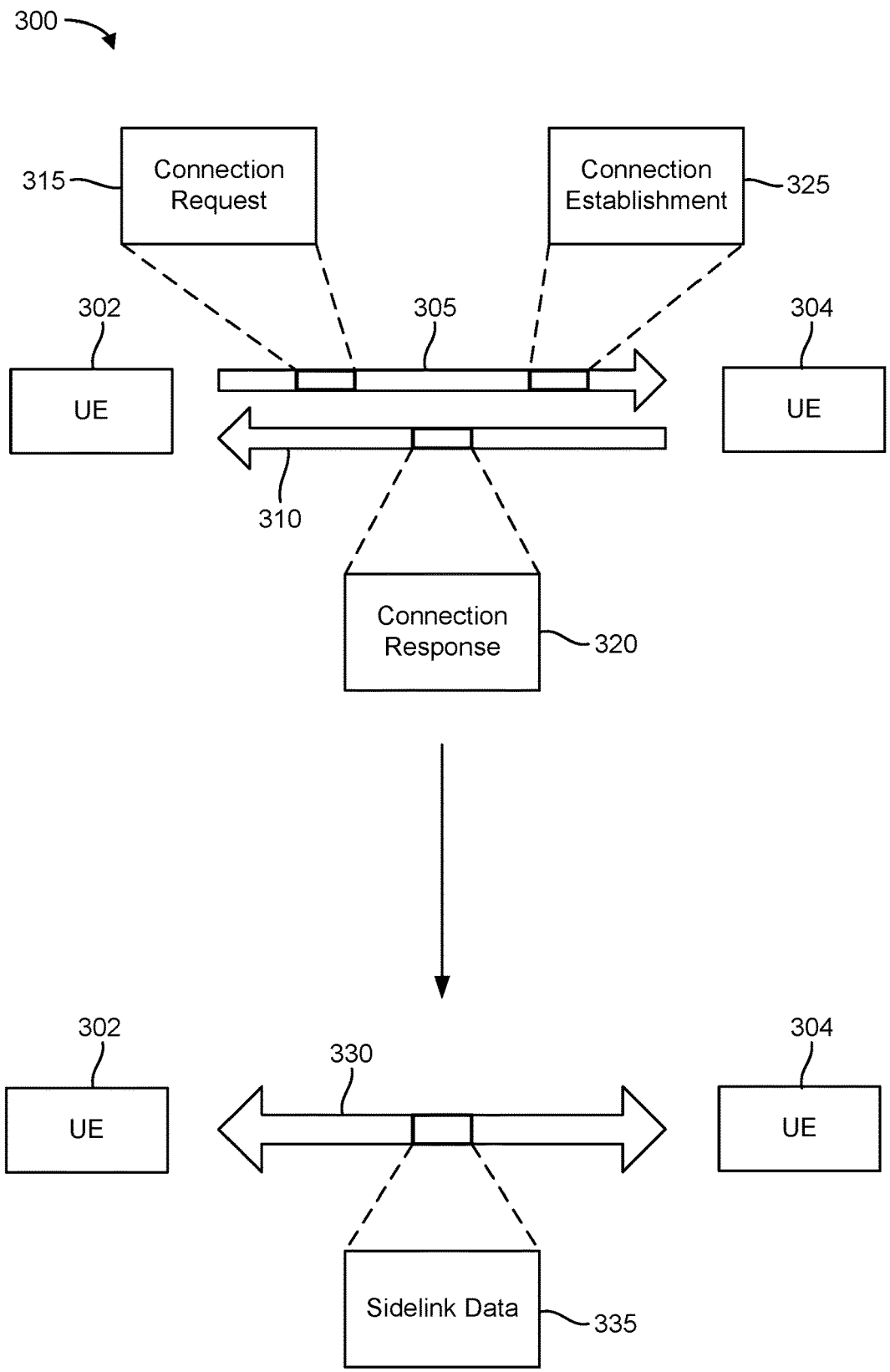
FIG. 3 illustrates an example of a wireless communications system that supports unicast sidelink establishment in accordance with aspects of the disclosure.

FIG. 3 illustrates an example of a wireless communications system 300 that supports unicast sidelink establishment in accordance with aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As a specific example, UEs 302 and 304 may correspond to V-UEs 160 in FIG. 1. In the example of FIG. 3, the UE 302 may attempt to establish a unicast connection over a sidelink with UE 304, which may be a V2X communication link between UE 302 and UE 304. Additionally or alternatively, the unicast connection over the sidelink may generally be used for sidelink communications between any two UEs. Thus, the established sidelink connection may correspond to sidelinks 162 and/or 168 in FIG. 1 and/or wireless unicast sidelink 242 in FIGS. 2A and 2B. The sidelink connection may be established for signaling in an omni-directional frequency range (e.g., FR1) as shown in the upper part of the FIG. 3, and a mmW frequency range (e.g., FR2) for data transmission as shown in the lower part of FIG. 3. In some cases, UE 302 may be referred to as an initiating UE that initiates the unicast connection procedure, and UE 304 may be referred to as a target UE that is targeted for the unicast connection procedure by the initiating UE.

For establishing the unicast connection, access stratum (AS) (a functional layer in the UMTS and LTE protocol stacks between the RAN and the UE that is responsible for transporting data over wireless links and managing radio resources, also referred to as "Layer 2" or "L2") parameters may be configured and negotiated between UE 302 and UE 304. For example, a transmission and reception capability matching may be negotiated between UE 302 and UE 304. Each UE may have different capabilities (e.g., transmission and reception capabilities, 64 quadrature amplitude modulation (QAM), transmission diversity, carrier aggregation (CA) capabilities, supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the unicast connection establishment. Conventionally, UE 302 may identify and locate candidates for unicast communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in a NR sidelink broadcast). In some cases, UE 304 may include one or more parameters for itself in the service announcement, including connection parameters and/or capabilities it possesses. UE 302 may then monitor for and receive the broadcasted service announcement to identify potential UEs for corresponding unicast connections. In some cases, UE 302 may identify the potential UEs based on the capabilities each UE indicates in their respective service announcements.

The service announcement may include information to assist UE 302 (e.g., or any initiating UE) to identify the UE transmitting the service announcement (UE 304 in the example of FIG. 3). For example, the service announcement may include channel information where direct communication requests may be sent. In some cases, the channel information may be specific to RAT (e.g., LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential unicast connection target (UE 304 in the example of FIG. 3), the initiating UE (UE 302 in the example of FIG. 3) may transmit a connection request 315 to the identified target UE 304. In some cases, the connection request 315 may be a first RRC message transmitted by UE 302 to request a unicast connection with UE 304 (e.g., an RRCDirectConnectionSetupRequest message). For example, the unicast connection may utilize the PC5 interface for the unicast link, and the connection request 315 may be an RRC connection setup request message. Additionally, UE 302 may use a sidelink signaling radio bearer 305 to transport the connection request 315.

After receiving the connection request 315, UE 304 may determine whether to accept or reject the connection request 315. UE 304 may base this determination on a transmission/reception capability, an ability to accommodate the unicast connection over the sidelink, a particular service indicated for the unicast connection, the contents to be transmitted over the unicast connection, or a combination thereof. For example, if UE 302 wants to use a first RAT to transmit or receive data, but UE 304 does not support the first RAT, then UE 304 may reject the connection request 315. Additionally or alternatively, UE 304 may reject the connection request 315 based on being unable to accommodate the unicast connection over the sidelink due to a limited radio resource, a scheduling issue, etc. Accordingly, UE 304 may transmit an indication of whether the request is accepted or rejected in a connection response 320. Similar to UE 302 and the connection request 315, UE 304 may use a sidelink signaling radio bearer 310 to transport the connection response 320. Additionally, the connection response 320 may be a second RRC message transmitted by UE 304 in response to the connection request 315 (e.g., an RRCDirectConnectionResponse message).

In some cases, sidelink signaling radio bearers 305 and 310 may be the same sidelink radio signal bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that UE 304 accepted the connection request 315, UE 302 may then transmit a connection establishment 325 message on the sidelink signaling radio bearer 305 to indicate that the unicast connection setup is complete. In some cases, the connection establishment 325 may be a third RRC message (e.g., an RRCDirectConnectionSetupComplete message). Each of the connection request 315, the connection response 320, and the connection establishment 325 may use a basic capability when being transported from one UE to the other UE to enable each UE to be able to receive and decode the corresponding transmission (e.g., RRC message).

Additionally, identifiers may be used for each of the connection request 315, the connection response 320, and the connection establishment 325 (e.g., the RRC signaling). For example, the identifiers may indicate which UE 302/304 is transmitting which message and/or which UE 302/304 the message is intended for. For physical (PHY) channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical (PHY) layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, UE 302 and/or UE 304 may include RLC parameters when establishing the unicast connection to set an RLC context of the unicast connection. For example, the RLC context may indicate whether an AM (e.g., a reordering timer (t-reordering) is used) or an unacknowledged mode (UM) is used for the RLC layer of the unicast communications.

Additionally, UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1 and/or wireless unicast sidelink 242 in FIGS. 2A and 2B. In some cases, the sidelink data 335 may include RRC messages transmitted between the two UEs 302 and 304. To maintain this unicast connection on sidelink 330, UE 302 and/or UE 304 may transmit a keep alive message (e.g., RRCDirectLinkAlive message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
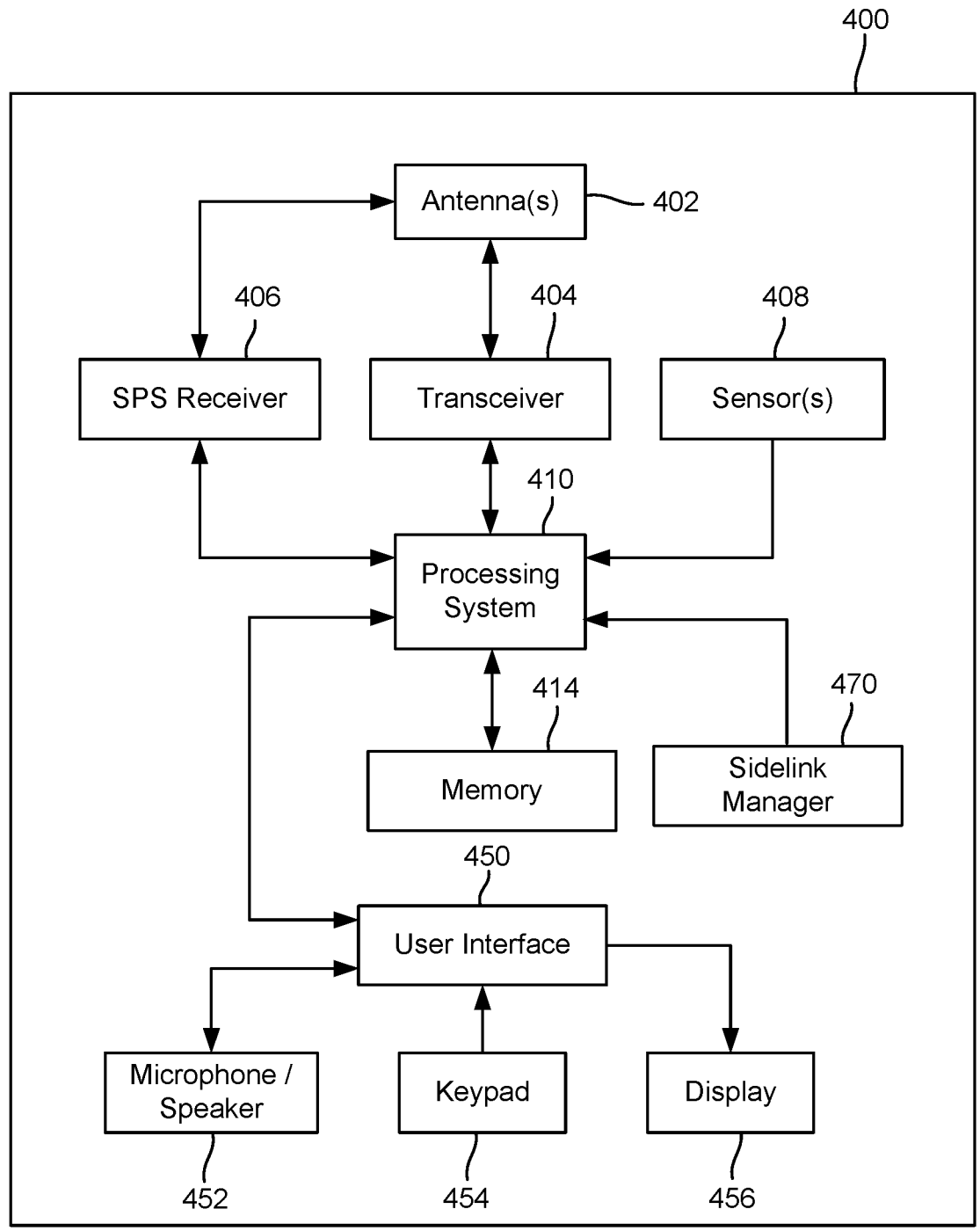
FIG. 4 is a block diagram illustrating various components of an exemplary UE according to at least one aspect of the disclosure.

FIG. 4 is a block diagram illustrating various components of an exemplary UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 for communicating with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., C-V2X or IEEE 802.11p) over one or more communication links (e.g., communication links 120, sidelinks 162, 166, 168, mmW communication link 184). The transceiver 404 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 for receiving satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to a processing system 410 to provide information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processing system 410 may include one or more microprocessors, microcontrollers, ASICs, processing cores, digital signal processors, or the like that provide processing functions, as well as other calculation and control functionality. The processing system 410 may include any form of logic suitable for performing, or causing the components of the UE 400 to perform, at least the techniques provided herein.

The processing system 410 may also be coupled to a memory 414 for storing data and software instructions for executing programmed functionality within the UE 400. The memory 414 may be on-board the processing system 410 (e.g., within the same integrated circuit (IC) package), and/or the memory 414 may be external to the processing system 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 provides for voice communication services with the UE 400. The keypad 454 comprises any suitable buttons for user input to the UE 400. The display 456 comprises any suitable display, such as, for example, a backlit liquid crystal display (LCD), and may further include a touch screen display for additional user input modes.

In an aspect, the UE 400 may include a sidelink manager 470 coupled to the processing system 410. The sidelink manager 470 (which may correspond to sidelink manager 170 in FIG. 1) may be a hardware, software, or firmware component that, when executed, causes the UE 400 to perform the operations described herein. For example, the sidelink manager 470 may be a software module stored in memory 414 and executable by the processing system 410. As another example, the sidelink manager 470 may be a hardware circuit (e.g., an ASIC, an FPGA, etc.) within the UE 400.

V2X communications in NR can occur in both sub-6 GHz frequency ranges (e.g., FR1) and mmW frequency ranges (e.g., FR2). For mmW unicast D2D or V2V communications, the initial communication establishment between neighboring devices (e.g., generally described herein as V-UEs solely for illustration and not limitation) can be accomplished respectively in two different approaches in two deployment options, a standalone (SA) deployment and a non-standalone (NSA) deployment. In an SA deployment, only the mmW frequency band is used. A mmW radio sidelink can be established between two V-UEs without the support of any other previously established communication link that may be, for example, in a different frequency band or in a different RAT.

Alternatively, establishment of the unicast mmW sidelink, including radio bearer establishment and associated QoS negotiation, can occur in an NSA deployment option. In an NSA deployment option, V-UEs can support communication in both FR1 and FR2. Thus, it is possible that the D2D or V2V mmW sidelink in FR2 (which uses a specific type of radio bearer configured for communication in mmW) is established with the support of a previously established direct link/connection (e.g., sidelink 330 where sidelink 330 is established in FR1) between the two V-UEs in FR1 with PC5-RRC signaling and/or device-to-device discovery mechanisms. In this approach, for example, one or more signaling radio bearers (SRBs) may be established over the FR1 sidelink first, and then one or more data radio bearers (DRBs) may be established over the FR2 sidelink.

Radio bearers are logical communication channels offered by Layer 2 (which includes a service data adaptation protocol (SDAP) layer, a PDCP layer, an RLC layer, and a MAC layer) to higher layers (e.g., the RRC and AS layers) for the transfer of either user data (on DRBs) for a communication session, or control data (on SRBs) for the communication session. An SRB carries dedicated control channel (DCCH) signaling data for a communication session. (A DCCH is a point-to-point dedicated channel for transmitting control information between a UE and the network or between the UE and another UE.) An SRB is used during connection establishment to deliver control signaling while on the connection. During connection establishment, an RRC Connection Setup procedure establishes the SRB. The SRB is then used to send all subsequent control signaling (e.g., physical layer, MAC layer, and other access layer control information) to start the desired communication session and establish the DRBs for the communication session. A DRB carries dedicated traffic channel (DTCH) data for a communication session. (A DTCH is a point-to-point dedicated channel for transmitting user/application data/traffic between a UE and the network or between the UE and another UE.) Establishment of the DRB(s) is achieved using a radio bearer (RB) Setup procedure on the SRB. The RB Setup procedure configures how both the DCCH and DTCH will be carried on the respective radio bearers.

Using the SRB, the configuration of the different access protocol layers are of a semi-static nature. Physical layer control is of a more dynamic nature in order to control resource allocation, in terms of time, frequency, space, and/or power. The access protocol layer configurations over the SRB occur at the time the radio bearer is being set up. The physical layer control and adaptation occur at the time the data is being exchanged.

The various aspects disclosed herein include techniques for establishing a mmW D2D data session in an NSA deployment. More specifically, the various aspects disclosed include techniques for establishing a DRB in a mmW band (e.g., FR2) with the support of a previously established communication session in an FR1 band. Given the nature of mmW communications (e.g., short range, high propagation loss), the problems related to beam discovery (e.g., the determination of the BPL that best serves the bidirectional communication between the two UEs) need to be solved along with the problem of establishing the radio bearers for the D2D/P2P/V2X unicast link.

The various aspects disclosed herein also include techniques for establishing the unicast radio bearers for a mmW sidelink in an NSA deployment option. Use of a previously established FR1 communication link makes the establishment of QoS-based FR2 radio bearers possible for mmW D2D or V2X unicast communications.

Figure 5:
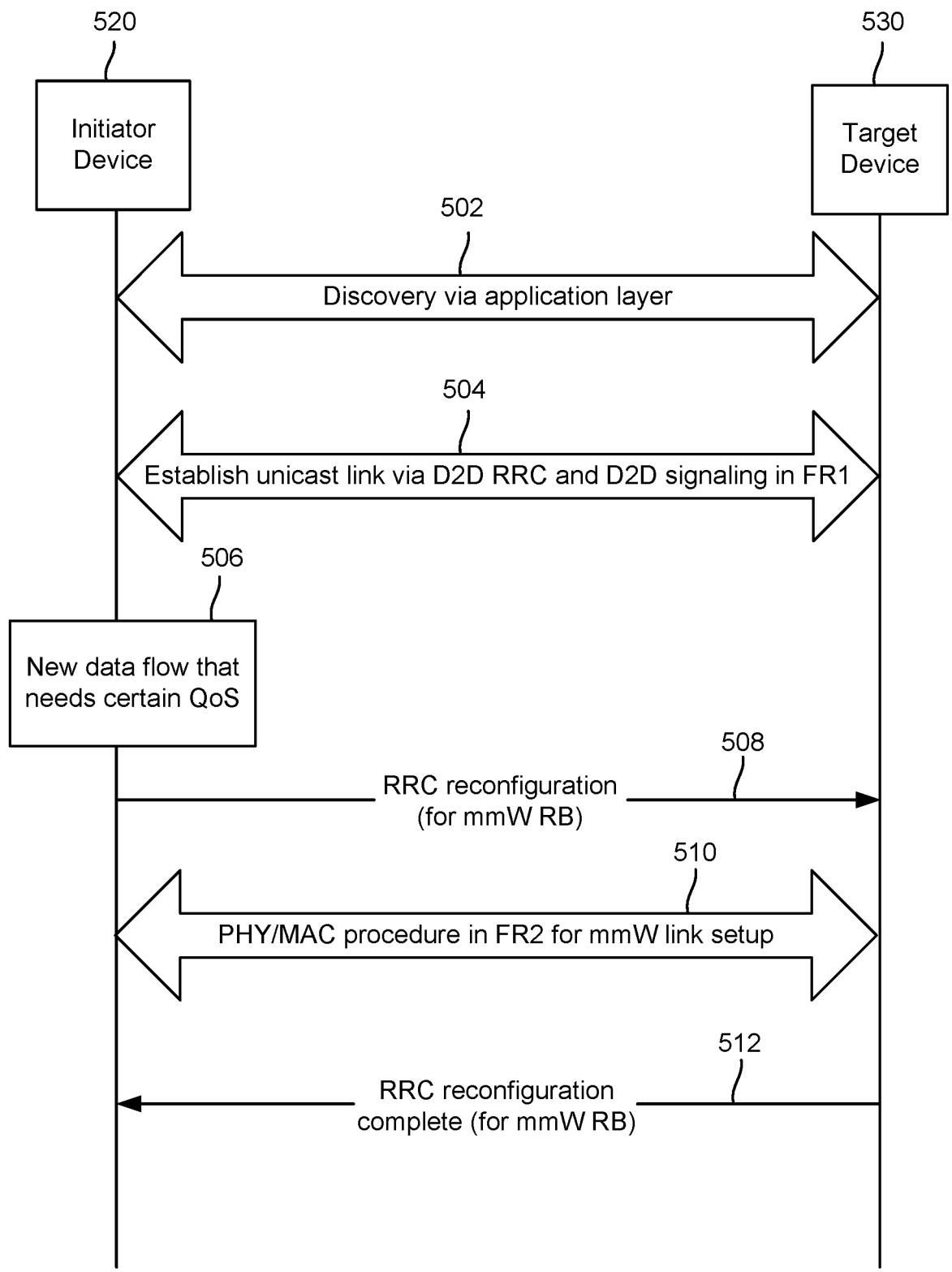
FIGS. 5 and 6 illustrate exemplary flows between an initiator device and a target device, according to aspects of the disclosure.

FIG. 5 illustrates an exemplary flow between an initiator device 520 and a target device 530, according to aspects of the disclosure. The devices 520 and 530 may be UEs (e.g., any of the UEs described herein). In the example of FIG. 5, because the FR2 sidelink described below is established in NSA mode, the FR2 sidelink is established after RRC setup of a sidelink in FR1, and this previously established sidelink in FR1 is used to establish the new sidelink in FR2.

At 502, a D2D discovery procedure can be performed at an application layer. For example, a D2D (e.g., V2V, V2X, etc.) peer discovery procedure can be performed in FR1 via broadcast/groupcast, as described above with reference to FIG. 3, using V2V for illustration. For example, the initiator device 520 may identify and locate candidate devices for unicast communications based on a BSM broadcasted by nearby UEs (e.g., target device 530). The BSM may include location information (e.g., GPS coordinates) of the broadcasting or groupcasting UE, security and identity information, and vehicle information (e.g., speed, maneuver, size, etc.) for the corresponding device, as appropriate. This service announcement may be an upper layer signal.

At 504, the devices 520 and 530 establish an RRC connection and an SRB on a unicast link in FR1 via a D2D RRC interface (e.g., an RRC procedure over the PC5 interface) and D2D signaling (e.g., PC5-S), as discussed above with reference to FIG. 3. As discussed above with reference to FIG. 3, a PC5 unicast RRC establishment in FR1 may also include a capability exchange between devices 520 and 530. Such capabilities may include, for example, whether the devices 520 and 530 support an FR2 band and simultaneous transmission and reception in both FR1 and FR2. As used herein, the term "simultaneous" communication on the first frequency band and the second frequency band means that a device is capable of communicating over both frequency bands during overlapping times, but does not require that any device is sending and/or receiving data on both frequency bands at the same time.

At 506, the initiator device 520 determines that it has a new data flow for target device 530 that needs a new sidelink radio bearer (SLRB) because, for example, the new data flow requires a certain QoS (e.g., a certain data rate, throughput, latency, etc.). Based on configuration information (e.g., from a network entity, such as a serving base station or an application server over a Uu interface), negotiation (e.g., with the target device 530 over a PC5-RRC interface or with a network entity over a Uu interface), or decision to support a specific QoS-to-SLRB mapping, the initiator device 520 determines that the new SLRB is to be in FR2. In an aspect, the configuration or QoS-to-SLRB mapping may indicate that for a data flow having a QoS requirement in terms of latency or throughput above some threshold, the initiator device 520 will attempt to establish an additional sidelink in FR2. In an aspect, a negotiation with the network entity or the target device 530 may include the initiator device 520 providing options to the target device 530 and the target device 530 making the decision.

At 508, having determined to establish an SLRB sidelink in FR2 with target device 530, the initiator device 520 sends an RRC reconfiguration message (e.g., an RRCDirectConnectionReconfiguration message) to the target device 530 over the previously established SRB. In addition to normal PDCP/RLC/MAC layer configuration, the radio bearer configuration process includes mmW physical layer configurations for beam direction(s) and resource, timing, location, and/or sequence ID parameters for L1/L2 layer procedures.

At 510, the devices 520 and 530 perform PHY/MAC procedures in FR2 for the new mmW sidelink. The devices 520 and 530 perform PHY/MAC procedures in FR2 to determine the serving BPL and synchronization and to initiate a mmW QoS-based V2V unicast link as requested in stage 508. The PHY/MAC procedures may include determining the direction of the transmit beam(s) used by the initiator device 520 and the receive beam(s) used by the target device 530. Specifically, in stages 502 and/or 504, the devices 520 and 530 exchange their geographic locations (e.g., GPS coordinates) and possibly information describing their current paths (e.g., direction of travel, speed, etc.). Based on these known locations, the devices 520 and 530 can aim their respective transmit and receive beam(s) as close as possible to the estimated direction of the other device. That is, a transmitter (e.g., initiator device 520) can only aim a transmit beam in certain directions, and therefore, may not be able to aim a transmit beam exactly at the estimated location of the target device 530. Instead, it selects the transmit beam(s) that can be directed in the direction(s) closest to the estimated direction of the target device 530. The same applies to receive beams of a receiver (e.g., target device 530).

At 512, the initiator device 520 sends an RRC reconfiguration complete message (e.g., RRCDirectConnectionReconfigurationComplete) to the target device 530 informing the target device 530 that the FR2 sidelink has been established. The initiator device 520 can then send the additional data flow (i.e., having the certain QoS requirement) over the newly established FR2 sidelink. In addition, data can flow in the reverse direction, if desired, through reflective QoS.

In an alternative aspect, RRC establishment could occur in FR2 instead of FR1, and the RRC session could be used to establish a data-only sidelink in FR1. In such a case, an RRC session would be established in FR2, and the RRC reconfiguration messages would be sent on FR2. In this alternative, the SRB would be established in the FR2 band and a new DRB would be established in the FR1 band.

It will be appreciated that in the first aspect discussed above, an FR2 band is used after the RRC setup messages in the FR1 band to establish the new FR2 DRB, and data is communicated in FR2 while control signaling is communicated on the SRB in FR1. In the first aspect, the signaling on the SRB in FR1 is used to establish the new mmW physical layer channel, and there is also a data session change as a new data flow (on a DRB) is added in this new band. In the alternative aspect, signaling on an SRB in FR2 can be used to establish a new FR1 DRB. Additionally, as noted above, it will be appreciated that although FIG. 5 has been described generally in terms of a V2V procedure, it is equally applicable to any D2D connection.

The foregoing has described L2 and L3 procedures for AS DRB establishment. The following describes the L1 (i.e., physical layer) signaling handshake (e.g., preamble, beam response) and other AS layer procedures (excluding RRC) in FR2 such that mmWave V2X unicast communication is possible in NSA mode.

As discussed above with reference to FIG. 5, from stages 502 to 508, the target device obtains, either through the FR1 V2V PC5 sidelink (established at 504) or a Uu interface, mmW parameters for the initiator device, the location (e.g., GPS coordinates) of the initiator device, the requested QoS for the FR2 mmW link, the number of transmit beams used by the initiator device, their periodicity, and the combination of their beam response (BR) and PRACH configuration.

Figure 6:
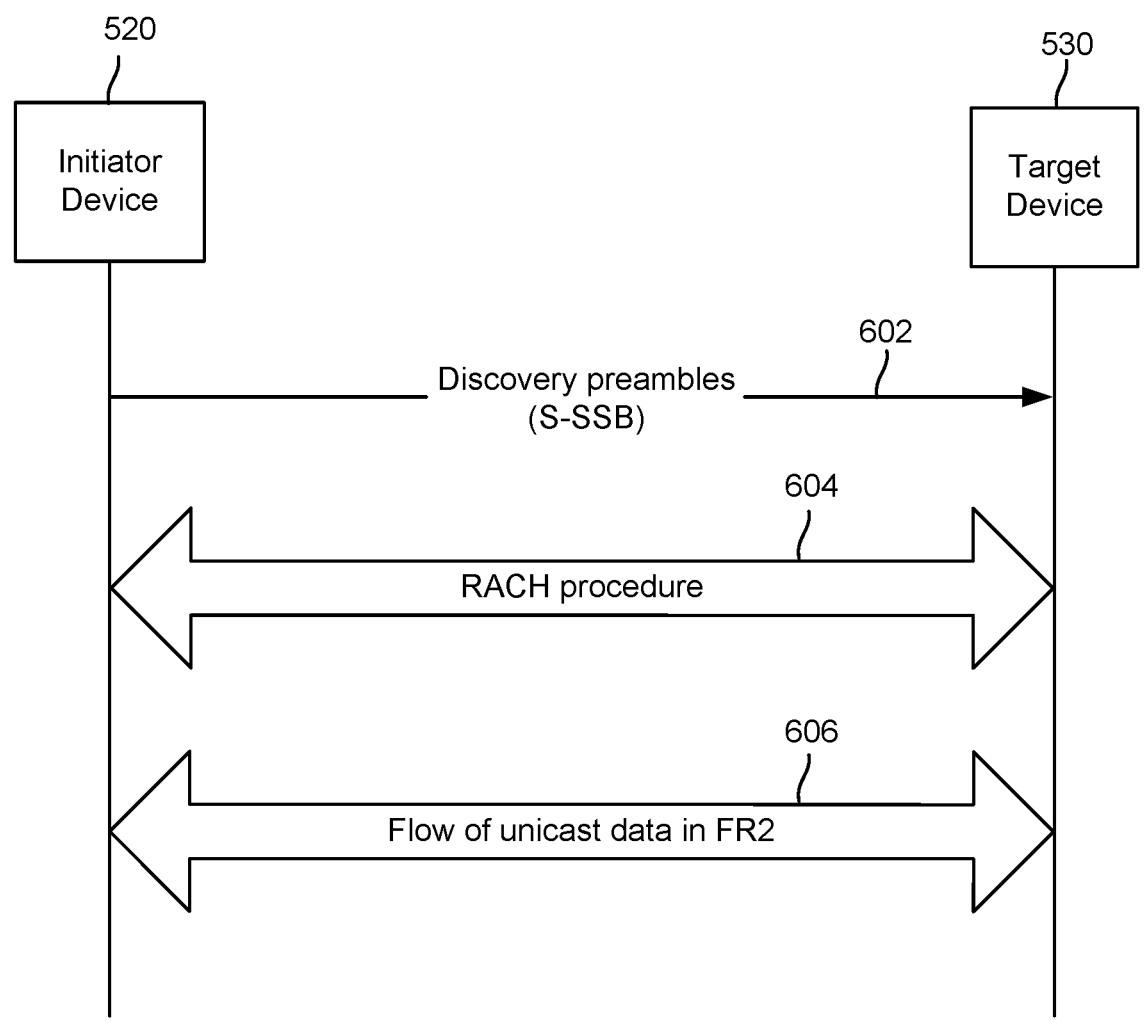

FIG. 6 illustrates an exemplary flow between the initiator device 520 and the target device 530, according to aspects of the disclosure. More specifically, the flow illustrated in FIG. 6 illustrates stage 510 of FIG. 5 in greater detail.

At 602, the initiator device 520 sends discovery preambles to the target device 530 on one or more transmit beams. Discovery preambles are sequences similar to primary synchronization signals (PSS) and secondary synchronization signals (SSS) in NR that assist the target device (e.g., target device 530) to identify the initiator device (e.g., initiator device 520) together with a beam identifier. Based on this information, the target device can determine which initiator device is transmitting on which beam.

In an aspect, the initiator device 520 may periodically sweep transmit beams to facilitate BPL determination. Alternatively, the target device 530 can request, over the FR1 PC5 V2V sidelink established at 504, that the initiator device 520 send the discovery preambles at 602. Thus, the transmission of the discovery preambles at 602 may be periodic or on-demand. For both approaches, the target device 530 does not need to send a beam response (the beam response is how two devices discover each other in FR2, but here, the initiator and target devices 520 and 530 have already discovered each other to setup the FR1 sidelink), but in FR2, they should still determine the BPL (i.e., the association between the best transmit used by a transmitter and the best receive beam used by a receiver for a communication session over an FR2 sidelink).

In NSA, to further take advantage of the known locations of the initiator and target devices 520 and 530 (obtained over the previously established FR1 sidelink), the initiator and target devices 520 and 530 can employ a non-uniform pattern of transmit beam sweeping and receive beam scanning at the discovery preambles stage 602 to focus on "likely directions" determined from the relative locations of the initiator and target devices 520 and 530. More specifically, the target device 530 can attempt to receive the transmit beam(s) from the initiator device 520 on a subset of receive beams in the likely direction of the initiator device 520. Similarly, the initiator device 520 can transmit one or more transmit beams in the likely direction of the target device 530. With autonomous driving and path sharing, this transmit beam sweeping and receive beam scanning can be further enhanced in such a way as to minimize interference and reduce BPL determination time. For example, by knowing or being able to predict the location of each UE (e.g., initiator device 520 and target device 530), the arc of the beam sweep for both transmission and focus of the antennas for reception can provide for reduced time and more accurate BPL determination given that both beam transmit and beam receive entities are in movement in this complex wireless environment.

Once the target device 530 acquires a transmit beam from the initiator device 520, the flow proceeds to 604 if the target device 530 also desires a mmW unicast connection to the initiator device 520. That is, if only the initiator device 520 will be transmitting data over the mmW unicast sidelink, only the initiator device 520 needs to determine a transmit beam. However, if the target device 530 also wishes to transmit data to the initiator device 520 over the mmW unicast sidelink, the target device 530 will also need to determine a transmit beam for the connection, and the initiator device 520 will need to determine a receive beam.

In any case (i.e., whether the initiator device 520 desires to transmit data to the target device 530 or the target device 530 desires to transmit data to the initiator device 520, or both devices desire to transmit data to each other) the BPL determination is bi-directional. In the case that only the initiator device 520 desires to send data to the target device 530, even in a passive role, the target device 530 still needs to send an ACK/NACK and possible channel conditions as feedback to the initiator device 520, thereby establishing the mmW link in both directions. On the reverse side (i.e., target device 530 to initiator device 520), beam reciprocity can be assumed, meaning that the best receive beam at the target device 530 is assumed to be the best transmit beam in the opposite direction. In terms of QoS over the mmW unicast sidelink, reflective QoS can be assumed at the target device 530, where the target device 530 infers the QoS parameters for reverse transmissions based on the direct initiator to target transmission(s).

The target device 530 starts a timer at the instant the mmW connection parameters are received from the initiator device 520 over FR1. If the timer expires before the PRACH procedure (also referred to as a "RACH procedure," a "random access procedure," and the like) in stage 604 is started, fresh mmW connection parameters would need to be fetched over the FR1 sidelink, as at 502 to 508 of FIG. 5. Alternatively, these parameters can be fetched over an FR2 sidelink if operating in SA mode. In this later scenario, a beam response from the target device 530 will initiate the broadcast of mmW parameters in FR2 from the initiator device 520.

At 604, if the target device 630 decides to proceed with a mmW unicast connection with the initiator device 520, it sends a PRACH preamble to the initiator device 520. In an aspect, the PRACH preamble is selected from a contention-based or a contention-free pool and is associated in terms of time and frequency resources to the transmit beam(s) from the initiator device 520 as configured during the discovery procedure of stage 502 of FIG. 5. The main intention of the PRACH procedure at this stage is not to establish an RRC connection in FR2 (unless the alternative approach to establishing an instance of RRC in FR2 has been adopted), but to provide the devices with time alignments and D2D power control initialization to enable effective data communication in the FR2 band.

Stage 606 includes D2D link adaptation and QoS-aware scheduling in FR2 for unicast transmissions. For NSA operation, the following enhancements can be considered. For example, PHY control for the FR2 sidelink can be sent via the FR1 sidelink, as an alternative to sending it over the FR2 sidelink, which triggers the data on the FR2 sidelink. As another example, because the FR2 sidelink needs beamforming, if the initiator device 520 has multiple simultaneous FR2 sidelinks with multiple target devices 530, the initiator device 520 can benefit by knowing in which direction to beamform. One solution is for the initiator device 520 to use a predetermined schedule, such as assigning a first slot (a resource of, e.g., 1 millisecond (ms) in the time domain) to a first target device 530, a second slot to a second target device 530, and so on. However, this solution has drawbacks in terms of resource reservation. If the PHY control comes from the FR1 sidelink, then the initiator device 520 does not have to commit to any particular beamforming direction beforehand. Instead, it can choose the beamforming direction at the time it needs to transmit data to the target device 530. As yet another solution, if the initiator device 520 receives multiple PHY control parameters in FR1 and is not capable (e.g., given its hardware constraint) of beamforming in all of the requested directions, the initiator device 520 can prioritize the beamforming directions as a function of QoS deadlines with specific target devices 530. In an aspect, if the initiator device 520 receives a beam sweeping request from multiple non-geographically overlapped target devices 530, the initiator device 520 may resume beam sweeping over the entire set of transmit beams after communicating with a given target device 530 over a given transmit beam.

At the end of stage 606, the unicast FR2 sidelink has been established and can now be used for data transmission. For example, the initiator device 520 may use the FR2 sidelink for user data or application data requesting a higher QoS than a sidelink in FR1 could provide.

As will be appreciated, the aspects described above with reference to FIGS. 5 and 6 provide an advantage of speeding up BPL acquisition and resource utilization in the FR2 band by using the information received over the previously established FR1 sidelink (e.g., at 504 of FIG. 5) and/or discovery procedure (e.g., at 502 of FIG. 5). For example, by using the GPS locations and/or shared path information from both devices, the initiator and target devices 520 and 530 are advantageously able to more accurately estimate initial directions for the transmit and receive beams, resulting in more effectively sweeping or scanning on a subset of transmit and receive beams, rather than having to perform full beam sweeps/scans. Further, besides beam sweeping/scanning over a limited set of beams to speed up BPL acquisition, transmit beam sweeping air interface resource utilization can be controlled from the supporting PC5 link in FR1 to advantageously minimize resource utilization and collisions in FR2.

In addition, the PRACH configuration provided in the FR1 sidelink provides an advantage that PRACH access preambles can be sent in the FR2 band contention-free. Further, cross resource scheduling can be used such that PHY control is sent on FR1 while data is sent on FR2, thereby advantageously avoiding unnecessary scheduling resource reservation for multiple beam transmissions in FR2. As yet another advantage, the initiator device 520 can select/prioritize specific beam transmissions based on QoS in the event that multiple simultaneous beam transmissions are impossible.

Figure 7:
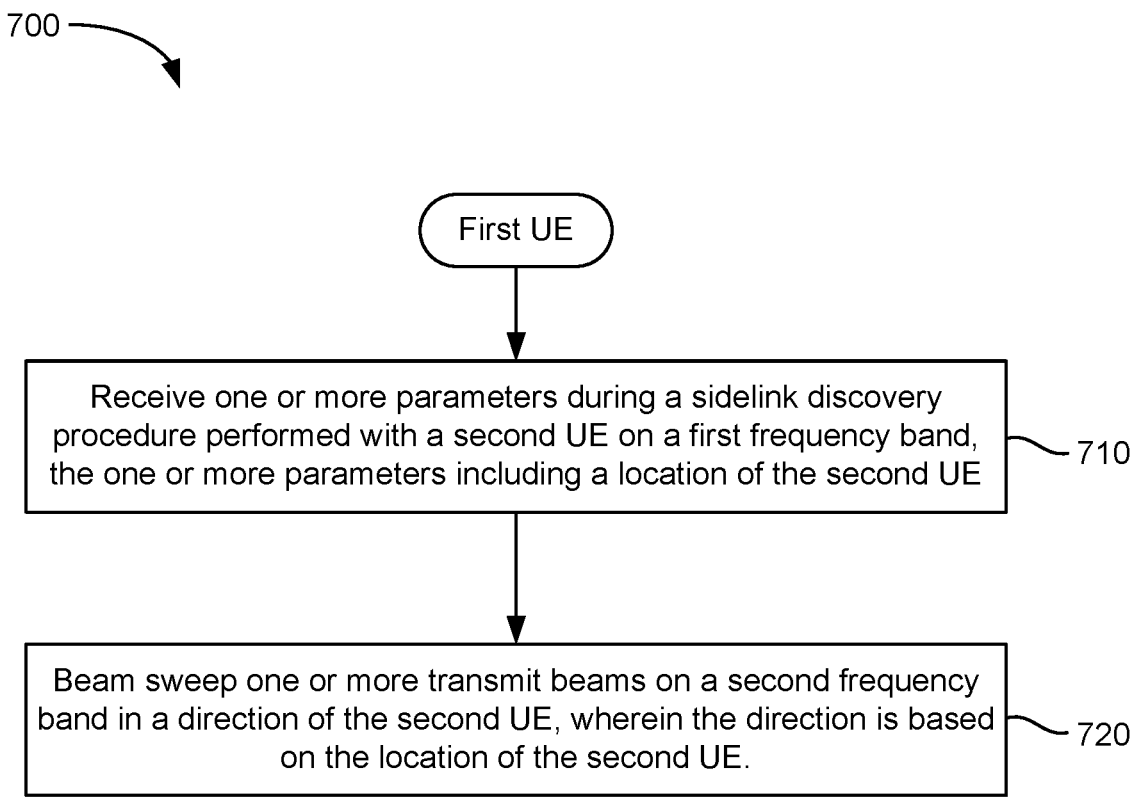
FIGS. 7 to 10 illustrate exemplary flows for wireless communication, according to aspects of the disclosure.

FIG. 7 illustrates an exemplary flow 700 for wireless communication, according to aspects of the disclosure. The flow 700 may be performed by a first UE (e.g., an initiator device), which may correspond to any of the UEs described herein.

At 710, the first UE receives one or more parameters during a sidelink discovery procedure performed with a second UE (e.g., a target device, which may correspond to any of the UEs described herein) on a first frequency band, the one or more parameters including a location of the second UE. In an aspect, operation 710 may be performed by transceiver(s) 404, processing system 410, memory 414, and/or sidelink manager 470, any or all of which may be considered means for performing this operation.

At 720, the first UE beam sweeps one or more transmit beams on a second frequency band in a direction of the second UE, wherein the direction is based on the location of the second UE. In an aspect, operation 720 may be performed by transceiver(s) 404, processing system 410, memory 414, and/or sidelink manager 470, any or all of which may be considered means for performing this operation.

In the flow 700, beam sweeping the one or more transmit beams at 720 may include periodically beam sweeping a plurality of transmit beams.

In the flow 700, where the first UE periodically beam sweeps a plurality of transmit beams, the first UE may use the plurality of transmit beams to communicate with a plurality of UEs over a corresponding plurality of DRBs on the second frequency band.

In the flow 700, where the first UE uses the plurality of transmit beams to communicate with a plurality of UEs, the first UE may prioritize data transmissions on the plurality of transmit beams based on QoS requirements of the data transmissions on the plurality of transmit beams.

In the flow 700, beam sweeping the one or more transmit beams at 720 may include beam sweeping the one or more transmit beams in response to reception of a request to perform the beam sweeping from the second UE, wherein the request is received over an SRB established on the first frequency band.

In the flow 700, where the first UE beam sweeps the one or more transmit beams in response to reception of a request to perform the beam sweeping, the first UE may continue a beam sweep of a plurality of transmit beams after beam sweeping the one or more transmit beams.

In the flow 700, where the first UE beam sweeps the one or more transmit beams in response to reception of a request to perform the beam sweeping, the flow 700 may further include (not shown) establishing the SRB on the first frequency band between the first UE and the second UE or between the first UE and a base station.

In the flow 700, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of the one or more transmit beams, a periodicity of the one or more transmit beams, a frequency of the one or more transmit beams, or a beam response and PRACH combination of the one or more transmit beams.

In the flow 700, where the one or more parameters include the geographic location of the first UE and the geographic location of the second UE, the direction from the first UE to the second UE may be based at least on the geographic location of the first UE and the geographic location of the second UE.

In the flow 700, the first frequency band may be an omni-directional frequency band (e.g, an FR1 band) and the second frequency band may be a frequency band in which a directional beam is used (e.g., an FR2 band).

In the flow 700, the first UE may be a first vehicle and the second UE may be a second vehicle, a roadside object, a roadsign, or a pedestrian.

In the flow 700, the first UE and the second UE may communicate over the first frequency band and the second frequency band using a PC5 D2D interface.

In the flow 700, the flow 700 may further include (not shown) receiving a PRACH preamble from the second UE on a transmit beam received over the second frequency band to permit the second UE to communicate with the first UE over a DRB established between the first UE and the second UE on the second frequency band.

In the flow 700, the first UE may transmit physical layer, MAC layer, and other access layer control information for the second frequency band to the second UE over the first frequency band, and only data flows to the second UE over a DRB established between the first UE and the second UE in the second frequency band.

Figure 8:
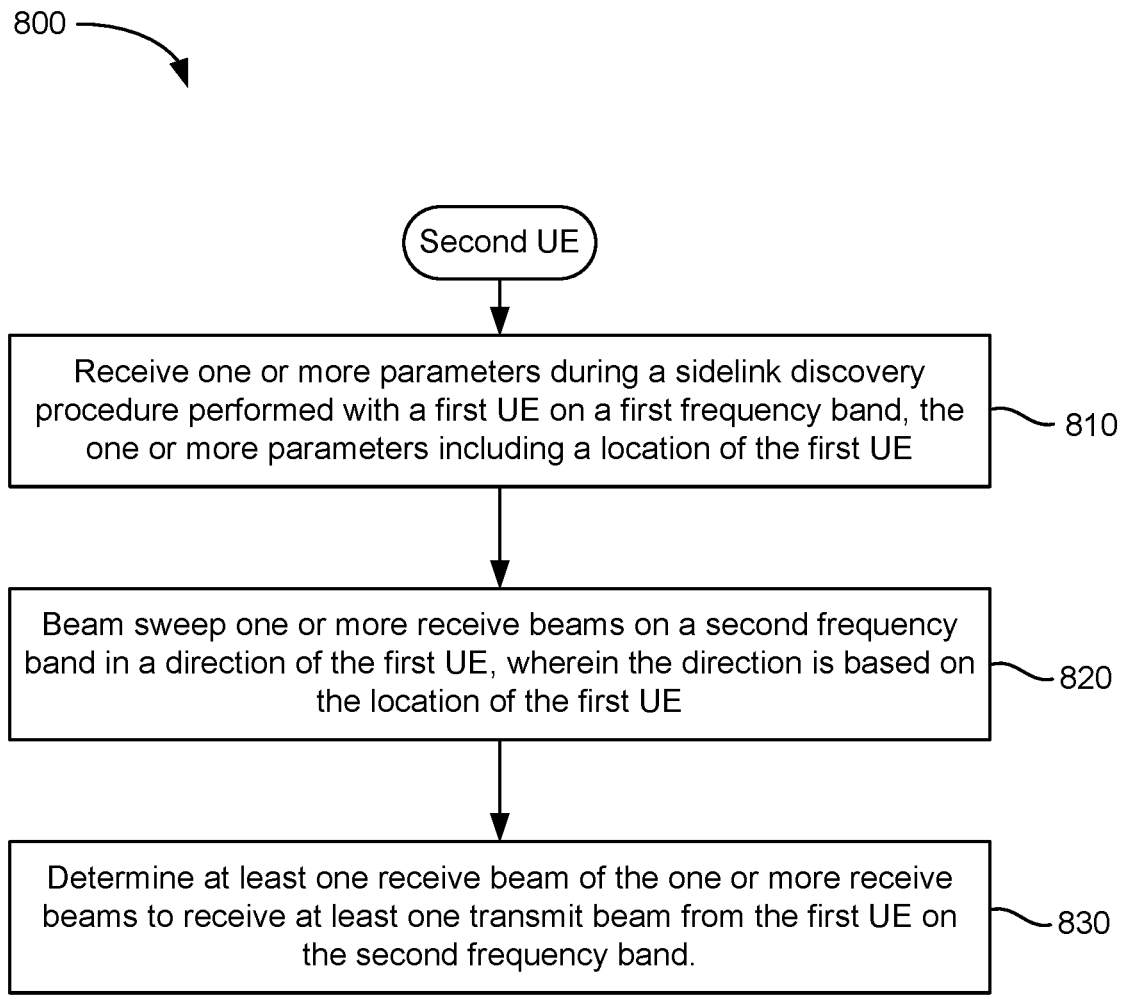

FIG. 8 illustrates an exemplary flow 800 for wireless communication, according to aspects of the disclosure. The flow 800 may be performed by a second UE (e.g., a target device), which may correspond to any of the UEs described herein.

At 810, the second UE receive one or more parameters during a sidelink discovery procedure performed with a first UE (e.g., an initiator device, which may correspond to any of the UEs described herein) on a first frequency band, the one or more parameters including a location of the first UE. In an aspect, operation 810 may be performed by transceiver(s) 404, processing system 410, memory 414, and/or sidelink manager 470, any or all of which may be considered means for performing this operation.

At 820, the second UE beam sweeps one or more receive beams on a second frequency band in a direction of the first UE, wherein the direction is based on the location of the first UE. In an aspect, operation 820 may be performed by transceiver(s) 404, processing system 410, memory 414, and/or sidelink manager 470, any or all of which may be considered means for performing this operation.

At 830, the second UE determines at least one receive beam of the one or more receive beams to receive at least one transmit beam from the first UE on the second frequency band. In an aspect, operation 830 may be performed by transceiver(s) 404, processing system 410, memory 414, and/or sidelink manager 470, any or all of which may be considered means for performing this operation.

In the flow 800, the flow 800 may further include (not shown) requesting, over an SRB established between the first UE and the second UE on the first frequency band, that the first UE perform a transmit beam sweep.

In the flow 800, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of one or more transmit beams beam swept by the first UE on the second frequency band, a periodicity of the one or more transmit beams, a frequency of the one or more transmit beams, or a beam response and PRACH combination of the one or more transmit beams.

In the flow 800, where the one or more parameters include the geographic location of the first UE and the geographic location of the second UE, the direction from the first UE to the second UE may be based at least on the geographic location of the first UE and the geographic location of the second UE.

In the flow 800, the first frequency band may be an omni-directional frequency band (e.g., an FR1 band) and the second frequency band may be a frequency band in which a directional beam is used (e.g., an FR2 band).

In the flow 800, the first UE may be a first vehicle and the second UE may be a second vehicle, a roadside object, a roadsign, or a pedestrian.

In the flow 800, the first UE and the second UE may communicate over the first frequency band and the second frequency band using a PC5 D2D interface.

In the flow 800, the flow 800 may further include (not shown) sending a PRACH preamble to the first UE on a transmit beam over the second frequency band to permit the second UE to communicate with the first UE over a DRB established between the first UE and the second UE on the second frequency band.

In the flow 800, the second UE may receive physical layer, MAC layer, and other access layer control information for the second frequency band from the first UE over the first frequency band, and only data flows from the first UE over a DRB established between the first UE and the second UE on the second frequency band.

Figure 9:
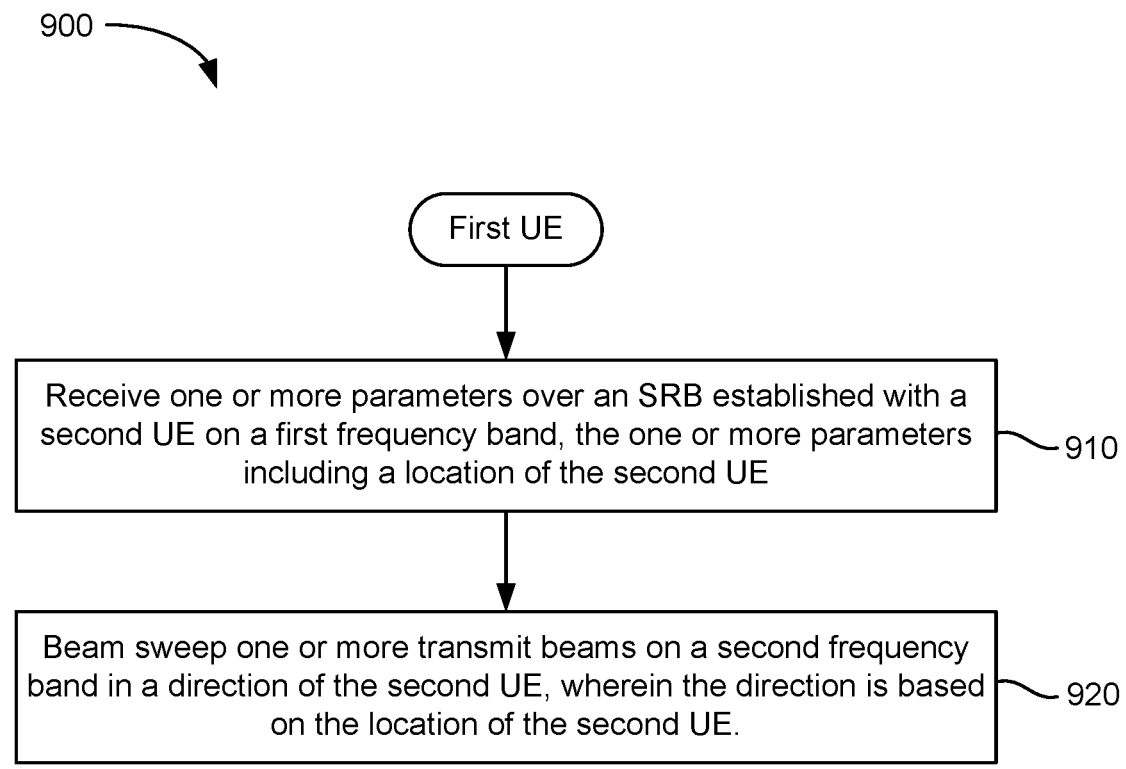

FIG. 9 illustrates an exemplary flow 700 for wireless communication, according to aspects of the disclosure. The flow 700 may be performed by a first UE (e.g., an initiator device), which may correspond to any of the UEs described herein.

At 910, the first UE receives one or more parameters over an SRB established with a second UE (e.g., a target device, which may correspond to any of the UEs described herein) on a first frequency band, the one or more parameters including a location of the second UE. In an aspect, operation 910 may be performed by transceiver(s) 404, processing system 410, memory 414, and/or sidelink manager 470, any or all of which may be considered means for performing this operation.

At 920, the first UE beam sweeps one or more transmit beams on a second frequency band in a direction of the second UE, wherein the direction is based on the location of the second UE. In an aspect, operation 920 may be performed by transceiver(s) 404, processing system 410, memory 414, and/or sidelink manager 470, any or all of which may be considered means for performing this operation.

In the flow 900, beam sweeping the one or more transmit beams at 920 may include periodically beam sweeping a plurality of transmit beams.

In the flow 900, where the first UE periodically beam sweeps a plurality of transmit beams, the first UE may use the plurality of transmit beams to communicate with a plurality of UEs over a corresponding plurality of DRBs on the second frequency band.

In the flow 900, where the first UE uses the plurality of transmit beams to communicate with a plurality of UEs, the first UE may prioritize data transmissions on the plurality of transmit beams based on QoS requirements of the data transmissions on the plurality of transmit beams.

In the flow 900, beam sweeping the one or more transmit beams at 920 may include beam sweeping the one or more transmit beams in response to reception of a request to perform the beam sweeping from the second UE, wherein the request is received over an SRB established on the first frequency band.

In the flow 900, where the first UE beam sweeps the one or more transmit beams in response to reception of a request to perform the beam sweeping, the first UE may continue a beam sweep of a plurality of transmit beams after beam sweeping the one or more transmit beams.

In the flow 900, where the first UE beam sweeps the one or more transmit beams in response to reception of a request to perform the beam sweeping, the flow 900 may further include (not shown) establishing the SRB on the first frequency band between the first UE and the second UE or between the first UE and a base station.

In the flow 900, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of the one or more transmit beams, a periodicity of the one or more transmit beams, a frequency of the one or more transmit beams, or a beam response and PRACH combination of the one or more transmit beams.

In the flow 900, where the one or more parameters include the geographic location of the first UE and the geographic location of the second UE, the direction from the first UE to the second UE may be based at least on the geographic location of the first UE and the geographic location of the second UE.

In the flow 900, the first frequency band may be an omni-directional frequency band (e.g., an FR1 band) and the second frequency band may be a frequency band in which a directional beam is used (e.g., an FR2 band).

In the flow 900, the first UE may be a first vehicle and the second UE may be a second vehicle, a roadside object, a roadsign, or a pedestrian.

In the flow 900, the first UE and the second UE may communicate over the first frequency band and the second frequency band using a PC5 D2D interface.

In the flow 900, the flow 900 may further include (not shown) receiving a PRACH preamble from the second UE on a transmit beam received over the second frequency band to permit the second UE to communicate with the first UE over a DRB established between the first UE and the second UE on the second frequency band.

In the flow 900, the first UE may transmit physical layer, MAC layer, and other access layer control information for the second frequency band to the second UE over the first frequency band, and only data flows to the second UE over a DRB established between the first UE and the second UE in the second frequency band.

Figure 10:
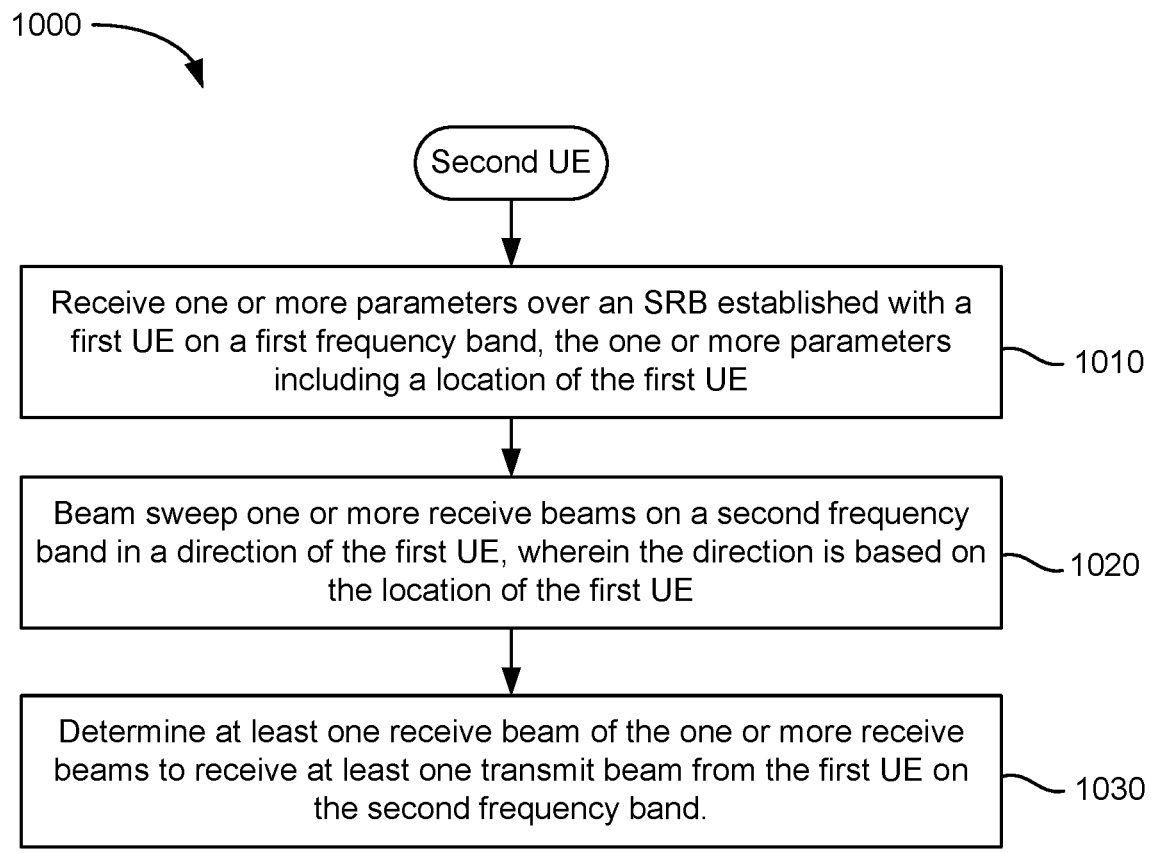

FIG. 10 illustrates an exemplary flow 1000 for wireless communication, according to aspects of the disclosure. The flow 1000 may be performed by a second UE (e.g., a target device), which may correspond to any of the UEs described herein.

At 1010, the second UE receives one or more parameters over an SRB established with a first UE on a first frequency band, the one or more parameters including a location of the first UE. In an aspect, operation 1010 may be performed by transceiver(s) 404, processing system 410, memory 414, and/or sidelink manager 470, any or all of which may be considered means for performing this operation.

At 1020, the second UE beam sweeps one or more receive beams on a second frequency band in a direction of the first UE, wherein the direction is based on the location of the first UE. In an aspect, operation 1020 may be performed by transceiver(s) 404, processing system 410, memory 414, and/or sidelink manager 470, any or all of which may be considered means for performing this operation.

At 1030, the second UE determines at least one receive beam of the one or more receive beams to receive at least one transmit beam from the first UE on the second frequency band. In an aspect, operation 1030 may be performed by transceiver(s) 404, processing system 410, memory 414, and/or sidelink manager 470, any or all of which may be considered means for performing this operation.

In the flow 1000, the flow 1000 may further include (not shown) requesting, over an SRB established between the first UE and the second UE on the first frequency band, that the first UE perform a transmit beam sweep.

In the flow 1000, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of one or more transmit beams beam swept by the first UE on the second frequency band, a periodicity of the one or more transmit beams, a frequency of the one or more transmit beams, or a beam response and PRACH combination of the one or more transmit beams.

In the flow 1000, where the one or more parameters include the geographic location of the first UE and the geographic location of the second UE, the direction from the first UE to the second UE may be based at least on the geographic location of the first UE and the geographic location of the second UE.

In the flow 1000, the first frequency band may be an omni-directional frequency band (e.g., an FR1 band) and the second frequency band may be a frequency band in which a directional beam is used (e.g., an FR2 band).

In the flow 1000, the first UE may be a first vehicle and the second UE may be a second vehicle, a roadside object, a roadsign, or a pedestrian.

In the flow 1000, the first UE and the second UE may communicate over the first frequency band and the second frequency band using a PC5 D2D interface.

In the flow 1000, the flow 1000 may further include (not shown) sending a PRACH preamble to the first UE on a transmit beam over the second frequency band to permit the second UE to communicate with the first UE over a DRB established between the first UE and the second UE on the second frequency band.

In the flow 1000, the second UE may receive physical layer, MAC layer, and other access layer control information for the second frequency band from the first UE over the first frequency band, and only data flows from the first UE over a DRB established between the first UE and the second UE on the second frequency band.

Figure 11:
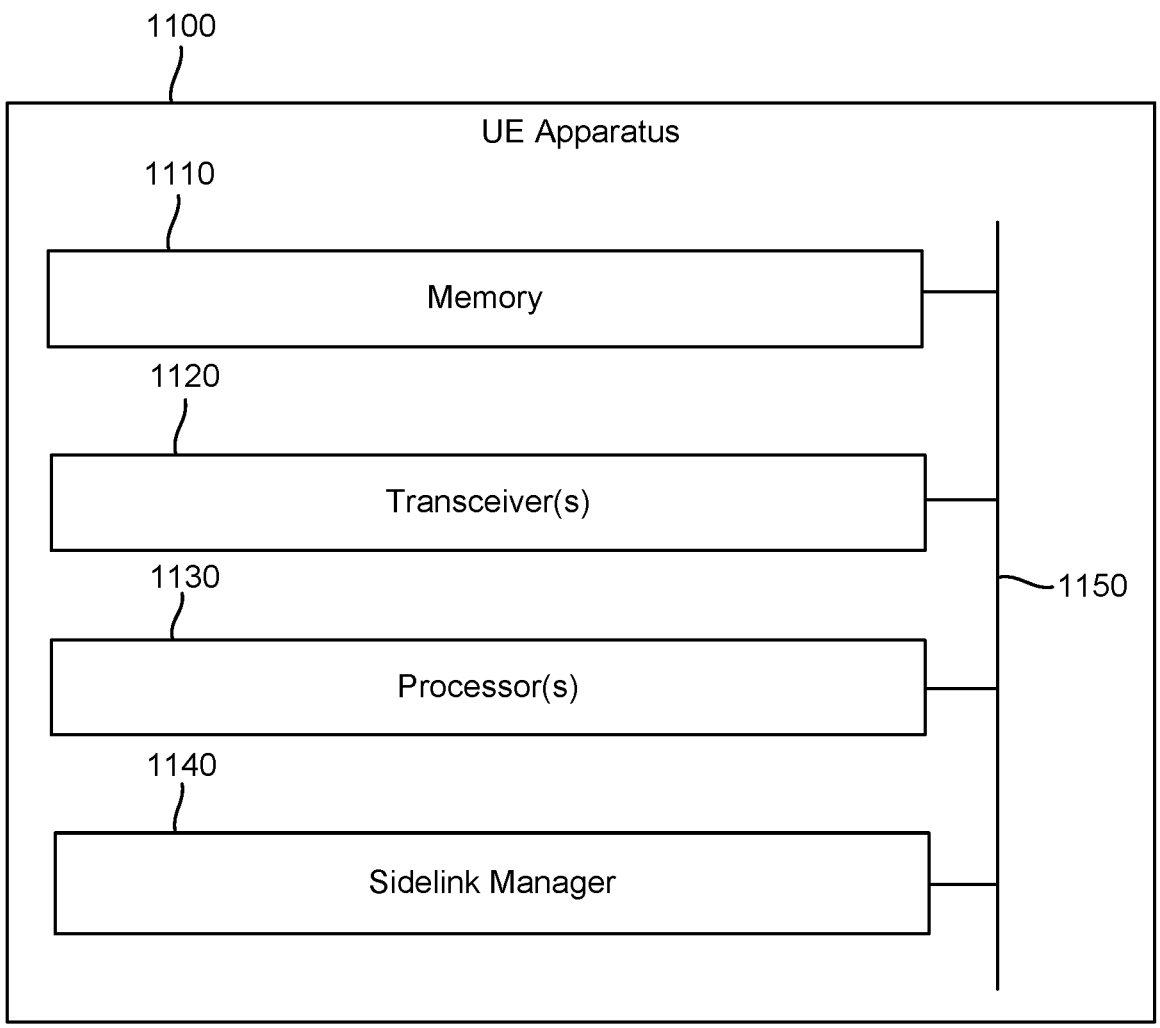
FIGS. 11 to 16 illustrate exemplary apparatuses for wireless communication, according to aspects of the disclosure.

FIG. 11 illustrates an exemplary UE apparatus 1100, which may correspond to any of the UEs described herein. The UE apparatus 1100 may include a memory 1110 (which may correspond to memory 414), at least one transceiver 1120 (which may correspond to transceiver(s) 404), at least one processor 1130 (which may correspond to processing system 410), and a sidelink manager 1140 (which may correspond to sidelink manager 470).

The sidelink manager 1140 may be a hardware, software, or firmware component that, when executed, causes the UE apparatus 1100 to perform the operations described herein. For example, the sidelink manager 1140 may be a software module stored in memory 1110 and executable by the at least one processor 1130. As another example, the sidelink manager 1040 may be a hardware circuit (e.g., an ASIC, an FPGA, etc.) coupled to or integrated into the at least one processor 1130.

The memory 1110, the at least one transceiver 1120, and the at least one processor 1130 may be communicatively coupled to each other over a data bus 1150. Where the sidelink manager 1140 is separate from the memory 1110 and the at least one processor 1130, the sidelink manager 1140 may be communicatively coupled to the other components of the UE apparatus 1100 over the data bus 1150.

In an aspect, the UE apparatus 1100 may be a first UE (e.g., an initiator device). In a first example aspect (which may correspond to the technique illustrated in FIG. 7), the at least one processor 1130 and/or the sidelink manager 1140 may be configured to receive, via the at least one transceiver 1120, one or more parameters during a sidelink discovery procedure performed with a second UE (e.g., a target device, which may correspond to any of the UEs described herein) on a first frequency band, the one or more parameters including a location of the second UE.

In the first example aspect, the at least one processor 1130 and/or the sidelink manager 1140 may cause the at least one transceiver to beam sweep one or more transmit beams on a second frequency band in a direction of the second UE, wherein the direction is based on the location of the second UE.

In a second example aspect (which may correspond to the technique illustrated in FIG. 9), where the UE apparatus 1100 is a first UE, the at least one processor 1130 and/or the sidelink manager 1140 may be configured to receive, via the at least one transceiver 1120, one or more parameters over an SRB established with a second UE (e.g., a target device, which may correspond to any of the UEs described herein) on a first frequency band, the one or more parameters including a location of the second UE. In the second example aspect, the at least one processor 1130 and/or the sidelink manager 1140 may cause the at least one transceiver to beam sweep one or more transmit beams on a second frequency band in a direction of the second UE, wherein the direction is based on the location of the second UE.

In both the first and second example aspects, the at least one processor 1130 and/or the sidelink manager 1140 being configured to cause the at least one transceiver 1120 to beam sweep the one or more transmit beams may include the at least one processor 1130 and/or the sidelink manager 1140 being configured to cause the at least one transceiver 1120 to periodically beam sweeping a plurality of transmit beams.

In both the first and second example aspects, where the the at least one processor 1130 and/or the sidelink manager 1140 are configured to cause the at least one transceiver 1120 to periodically beam sweep a plurality of transmit beams, the at least one processor 1130 and/or the sidelink manager 1140 may use the plurality of transmit beams to communicate with a plurality of UEs over a corresponding plurality of DRBs on the second frequency band.

In both the first and second example aspects, where the at least one processor 1130 and/or the sidelink manager 1140 uses the plurality of transmit beams to communicate with a plurality of UEs, the at least one processor 1130 and/or the sidelink manager 1140 may prioritize data transmissions on the plurality of transmit beams based on QoS requirements of the data transmissions on the plurality of transmit beams.

In both the first and second example aspects, the at least one processor 1130 and/or the sidelink manager 1140 being configured to cause the at least one transceiver 1120 to beam sweep the one or more transmit beams may include the at least one processor 1130 and/or the sidelink manager 1140 being configured to cause the at least one transceiver 1120 to beam sweep the one or more transmit beams in response to reception of a request to perform the beam sweeping from the second UE, wherein the request is received over an SRB established on the first frequency band.

In both the first and second example aspects, where the at least one processor 1130 and/or the sidelink manager 1140 is configured to cause the at least one transceiver 1120 to beam sweep the one or more transmit beams in response to reception of a request to perform the beam sweeping, the at least one processor 1130 and/or the sidelink manager 1140 may be configured to cause the at least one transceiver 1120 to continue a beam sweep of a plurality of transmit beams after beam sweeping the one or more transmit beams.

In both the first and second example aspects, where the at least one processor 1130 and/or the sidelink manager 1140 is configured to cause the at least one transceiver 1120 to beam sweep the one or more transmit beams in response to reception of a request to perform the beam sweeping, the at least one processor 1130 and/or the sidelink manager 1140 may be further configured to establish, via the at least one transceiver 1120, the SRB on the first frequency band between the first UE and the second UE or between the first UE and a base station.

In both the first and second example aspects, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of the one or more transmit beams, a periodicity of the one or more transmit beams, a frequency of the one or more transmit beams, or a beam response and PRACH combination of the one or more transmit beams.

In both the first and second example aspects, where the one or more parameters include the geographic location of the first UE and the geographic location of the second UE, the direction from the first UE to the second UE may be based at least on the geographic location of the first UE and the geographic location of the second UE.

In both the first and second example aspects, the first frequency band may be an omni-directional frequency band (e.g., an FR1 band) and the second frequency band may be a frequency band in which a directional beam is used (e.g., an FR2 band).

In both the first and second example aspects, the first UE may be a first vehicle and the second UE may be a second vehicle, a roadside object, a roadsign, or a pedestrian.

In both the first and second example aspects, the first UE and the second UE may communicate over the first frequency band and the second frequency band using a PC5 D2D interface.

In both the first and second example aspects, the at least one processor 1130 and/or the sidelink manager 1140 may further be configured to receive, via the at least one transceiver 1120, a PRACH preamble from the second UE on a transmit beam received over the second frequency band to permit the second UE to communicate with the first UE over a DRB established between the first UE and the second UE on the second frequency band.

In both the first and second example aspects, the at least one processor 1130 and/or the sidelink manager 1140 may be configured to cause the at least one transceiver 1120 to transmit physical layer, MAC layer, and other access layer control information for the second frequency band to the second UE over the first frequency band, and only data flows to the second UE over a DRB established between the first UE and the second UE in the second frequency band.

In an aspect, the UE apparatus 1100 may be a second UE (e.g., a target device). In a first example aspect (which may correspond to the technique illustrated in FIG. 8), the at least one processor 1130 and/or the sidelink manager 1140 may be configured to receive, via the at least one transceiver 1120, one or more parameters during a sidelink discovery procedure performed with a first UE (e.g., an initiator device, which may correspond to any of the UEs described herein) on a first frequency band, the one or more parameters including a location of the first UE.

In the first example aspect, the at least one processor 1130 and/or the sidelink manager 1140 may be configured to cause the at least one transceiver 1120 to beam sweep one or more receive beams on a second frequency band in a direction of the first UE, wherein the direction is based on the location of the first UE.

In the first example aspect, the at least one processor 1130 and/or the sidelink manager 1140 may be configured to determine at least one receive beam of the one or more receive beams to receive at least one transmit beam from the first UE on the second frequency band.

In a second example aspect (which may correspond to the technique illustrated in FIG. 10), where the UE apparatus 1100 is a second UE, the at least one processor 1130 and/or the sidelink manager 1140 may be configured to receive, via the at least one transceiver 1120, one or more parameters over an SRB established with a first UE on a first frequency band, the one or more parameters including a location of the first UE.

In the second example aspect, the at least one processor 1130 and/or the sidelink manager 1140 may be configured to cause the at least one transceiver 1120 to beam sweep one or more receive beams on a second frequency band in a direction of the first UE, wherein the direction is based on the location of the first UE.

In the second example aspect, the at least one processor 1130 and/or the sidelink manager 1140 may be configured to determine at least one receive beam of the one or more receive beams to receive at least one transmit beam from the first UE on the second frequency band.

In both the first and second example aspects, the at least one processor 1130 and/or the sidelink manager 1140 may further be configured to request, over an SRB established between the first UE and the second UE on the first frequency band, via the at least one transceiver 1120, that the first UE perform a transmit beam sweep.

In both the first and second example aspects, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of one or more transmit beams beam swept by the first UE on the second frequency band, a periodicity of the one or more transmit beams, a frequency of the one or more transmit beams, or a beam response and PRACH combination of the one or more transmit beams.

In both the first and second example aspects, where the one or more parameters include the geographic location of the first UE and the geographic location of the second UE, the direction from the first UE to the second UE may be based at least on the geographic location of the first UE and the geographic location of the second UE.

In both the first and second example aspects, the first frequency band may be an omni-directional frequency band (e.g., an FR1 band) and the second frequency band may be a frequency band in which a directional beam is used (e.g., an FR2 band).

In both the first and second example aspects, the first UE may be a first vehicle and the second UE may be a second vehicle, a roadside object, a roadsign, or a pedestrian.

In both the first and second example aspects, the first UE and the second UE may communicate over the first frequency band and the second frequency band using a PC5 D2D interface.

In both the first and second example aspects, the at least one processor 1130 and/or the sidelink manager 1140 may further be configured to cause the at least one transceiver 1120 to send a PRACH preamble to the first UE on a transmit beam over the second frequency band to permit the second UE to communicate with the first UE over a DRB established between the first UE and the second UE on the second frequency band.

In both the first and second example aspects, the at least one processor 1130 and/or the sidelink manager 1140 may be configured to receive, via the at least one transceiver 1120, physical layer, MAC layer, and other access layer control information for the second frequency band from the first UE over the first frequency band, and only data flows from the first UE over a DRB established between the first UE and the second UE on the second frequency band.

Figure 12:
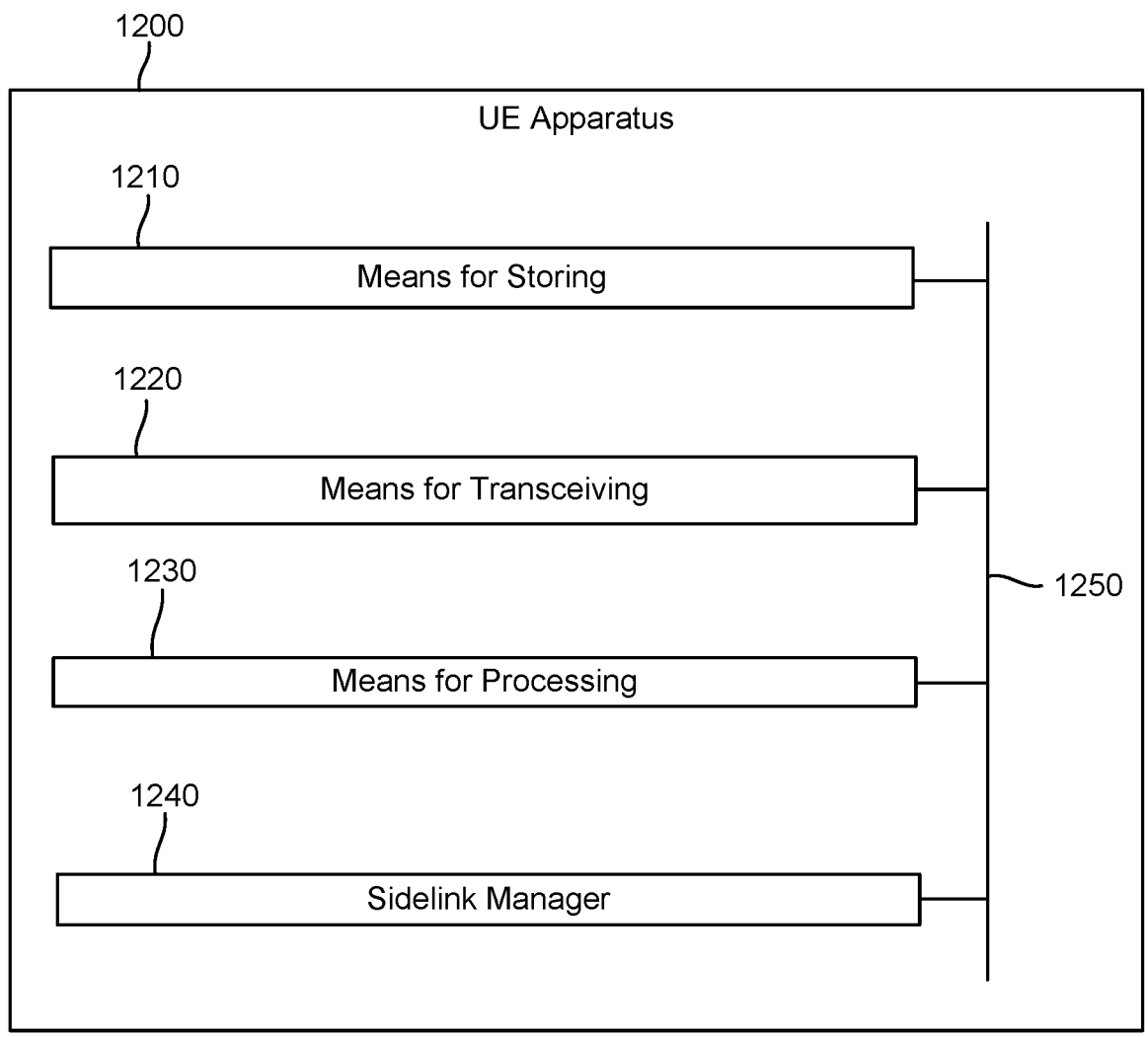

FIG. 12 illustrates an exemplary UE apparatus 1200, which may correspond to any of the UEs described herein. The UE apparatus 1200 may include a means for storing 1210 (which may correspond to memory 414), means for transceiving 1220 (which may correspond to transceiver(s) 404), means for processing 1230 (which may correspond to processing system 410), and a sidelink manager 1240 (which may correspond to sidelink manager 470).

The sidelink manager 1240 may be a hardware, software, or firmware component that, when executed, causes the UE apparatus 1200 to perform the operations described herein. For example, the sidelink manager 1240 may be a software module stored in means for storing 1210 and executable by the means for processing 1230. As another example, the sidelink manager 1040 may be a hardware circuit (e.g., an ASIC, an FPGA, etc.) coupled to or integrated into the means for processing 1230.

The means for storing 1210, the means for transceiving 1220, and the means for processing 1230 may be communicatively coupled to each other over a data bus 1250. Where the sidelink manager 1240 is separate from the means for storing 1210 and the means for processing 1230, the sidelink manager 1240 may be communicatively coupled to the other components of the UE apparatus 1200 over the data bus 1250.

In an aspect, the UE apparatus 1200 may be a first UE (e.g., an initiator device). In a first example aspect (which may correspond to the technique illustrated in FIG. 7), the means for processing 1230 and/or the sidelink manager 1240 may be configured to receive, via the means for transceiving 1220, one or more parameters during a sidelink discovery procedure performed with a second UE (e.g., a target device, which may correspond to any of the UEs described herein) on a first frequency band, the one or more parameters including a location of the second UE.

In the first example aspect, the means for processing 1230 and/or the sidelink manager 1240 may cause the at least one transceiver to beam sweep one or more transmit beams on a second frequency band in a direction of the second UE, wherein the direction is based on the location of the second UE.

In a second example aspect (which may correspond to the technique illustrated in FIG. 9), where the UE apparatus 1200 is a first UE, the means for processing 1230 and/or the sidelink manager 1240 may be configured to receive, via the means for transceiving 1220, one or more parameters over an SRB established with a second UE (e.g., a target device, which may correspond to any of the UEs described herein) on a first frequency band, the one or more parameters including a location of the second UE.

In the second example aspect, the means for processing 1230 and/or the sidelink manager 1240 may cause the at least one transceiver to beam sweep one or more transmit beams on a second frequency band in a direction of the second UE, wherein the direction is based on the location of the second UE.

In both the first and second example aspects, the means for processing 1230 and/or the sidelink manager 1240 being configured to cause the means for transceiving 1220 to beam sweep the one or more transmit beams may include the means for processing 1230 and/or the sidelink manager 1240 being configured to cause the means for transceiving 1220 to periodically beam sweeping a plurality of transmit beams.

In both the first and second example aspects, where the the means for processing 1230 and/or the sidelink manager 1240 are configured to cause the means for transceiving 1220 to periodically beam sweep a plurality of transmit beams, the means for processing 1230 and/or the sidelink manager 1240 may use the plurality of transmit beams to communicate with a plurality of UEs over a corresponding plurality of DRBs on the second frequency band.

In both the first and second example aspects, where the means for processing 1230 and/or the sidelink manager 1240 uses the plurality of transmit beams to communicate with a plurality of UEs, the means for processing 1230 and/or the sidelink manager 1240 may prioritize data transmissions on the plurality of transmit beams based on QoS requirements of the data transmissions on the plurality of transmit beams.

In both the first and second example aspects, the means for processing 1230 and/or the sidelink manager 1240 being configured to cause the means for transceiving 1220 to beam sweep the one or more transmit beams may include the means for processing 1230 and/or the sidelink manager 1240 being configured to cause the means for transceiving 1220 to beam sweep the one or more transmit beams in response to reception of a request to perform the beam sweeping from the second UE, wherein the request is received over an SRB established on the first frequency band.

In both the first and second example aspects, where the means for processing 1230 and/or the sidelink manager 1240 is configured to cause the means for transceiving 1220 to beam sweep the one or more transmit beams in response to reception of a request to perform the beam sweeping, the means for processing 1230 and/or the sidelink manager 1240 may be configured to cause the means for transceiving 1220 to continue a beam sweep of a plurality of transmit beams after beam sweeping the one or more transmit beams.

In both the first and second example aspects, where the means for processing 1230 and/or the sidelink manager 1240 is configured to cause the means for transceiving 1220 to beam sweep the one or more transmit beams in response to reception of a request to perform the beam sweeping, the means for processing 1230 and/or the sidelink manager 1240 may be further configured to establish, via the means for transceiving 1220, the SRB on the first frequency band between the first UE and the second UE or between the first UE and a base station.

In both the first and second example aspects, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of the one or more transmit beams, a periodicity of the one or more transmit beams, a frequency of the one or more transmit beams, or a beam response and PRACH combination of the one or more transmit beams.

In both the first and second example aspects, where the one or more parameters include the geographic location of the first UE and the geographic location of the second UE, the direction from the first UE to the second UE may be based at least on the geographic location of the first UE and the geographic location of the second UE.

In both the first and second example aspects, the first frequency band may be an omni-directional frequency band (e.g., an FR1 band) and the second frequency band may be a frequency band in which a directional beam is used (e.g., an FR2 band).

In both the first and second example aspects, the first UE may be a first vehicle and the second UE may be a second vehicle, a roadside object, a roadsign, or a pedestrian.

In both the first and second example aspects, the first UE and the second UE may communicate over the first frequency band and the second frequency band using a PC5 D2D interface.

In both the first and second example aspects, the means for processing 1230 and/or the sidelink manager 1240 may further be configured to receive, via the means for transceiving 1220, a PRACH preamble from the second UE on a transmit beam received over the second frequency band to permit the second UE to communicate with the first UE over a DRB established between the first UE and the second UE on the second frequency band.

In both the first and second example aspects, the means for processing 1230 and/or the sidelink manager 1240 may be configured to cause the means for transceiving 1220 to transmit physical layer, MAC layer, and other access layer control information for the second frequency band to the second UE over the first frequency band, and only data flows to the second UE over a DRB established between the first UE and the second UE in the second frequency band.

In an aspect, the UE apparatus 1200 may be a second UE (e.g., a target device). In a first example aspect (which may correspond to the technique illustrated in FIG. 8), the means for processing 1230 and/or the sidelink manager 1240 may be configured to receive, via the means for transceiving 1220, one or more parameters during a sidelink discovery procedure performed with a first UE (e.g., an initiator device, which may correspond to any of the UEs described herein) on a first frequency band, the one or more parameters including a location of the first UE.

In the first example aspect, the means for processing 1230 and/or the sidelink manager 1240 may be configured to cause the means for transceiving 1220 to beam sweep one or more receive beams on a second frequency band in a direction of the first UE, wherein the direction is based on the location of the first UE.

In the first example aspect, the means for processing 1230 and/or the sidelink manager 1240 may be configured to determine at least one receive beam of the one or more receive beams to receive at least one transmit beam from the first UE on the second frequency band.

In a second example aspect (which may correspond to the technique illustrated in FIG. 10), where the UE apparatus 1200 is a second UE, the means for processing 1230 and/or the sidelink manager 1240 may be configured to receive, via the means for transceiving 1220, one or more parameters over an SRB established with a first UE on a first frequency band, the one or more parameters including a location of the first UE.

In the second example aspect, the means for processing 1230 and/or the sidelink manager 1240 may be configured to cause the means for transceiving 1220 to beam sweep one or more receive beams on a second frequency band in a direction of the first UE, wherein the direction is based on the location of the first UE.

In the second example aspect, the means for processing 1230 and/or the sidelink manager 1240 may be configured to determine at least one receive beam of the one or more receive beams to receive at least one transmit beam from the first UE on the second frequency band.

In both the first and second example aspects, the means for processing 1230 and/or the sidelink manager 1240 may further be configured to request, over an SRB established between the first UE and the second UE on the first frequency band, via the means for transceiving 1220, that the first UE perform a transmit beam sweep.

In both the first and second example aspects, the one or more parameters may include at least one of a geographic location of the first UE, a geographic location of the second UE, a path of the first UE, a path of the second UE, a given QoS requirement for a data flow over a DRB established between the first UE and the second UE on the second frequency band, directions of one or more transmit beams beam swept by the first UE on the second frequency band, a periodicity of the one or more transmit beams, a frequency of the one or more transmit beams, or a beam response and PRACH combination of the one or more transmit beams.

In both the first and second example aspects, where the one or more parameters include the geographic location of the first UE and the geographic location of the second UE, the direction from the first UE to the second UE may be based at least on the geographic location of the first UE and the geographic location of the second UE.

In both the first and second example aspects, the first frequency band may be an omni-directional frequency band (e.g., an FR1 band) and the second frequency band may be a frequency band in which a directional beam is used (e.g., an FR2 band).

In both the first and second example aspects, the first UE may be a first vehicle and the second UE may be a second vehicle, a roadside object, a roadsign, or a pedestrian.

In both the first and second example aspects, the first UE and the second UE may communicate over the first frequency band and the second frequency band using a PC5 D2D interface.

In both the first and second example aspects, the means for processing 1230 and/or the sidelink manager 1240 may further be configured to cause the means for transceiving 1220 to send a PRACH preamble to the first UE on a transmit beam over the second frequency band to permit the second UE to communicate with the first UE over a DRB established between the first UE and the second UE on the second frequency band.

In both the first and second example aspects, the means for processing 1230 and/or the sidelink manager 1240 may be configured to receive, via the means for transceiving 1220, physical layer, MAC layer, and other access layer control information for the second frequency band from the first UE over the first frequency band, and only data flows from the first UE over a DRB established between the first UE and the second UE on the second frequency band.

Figure 13:
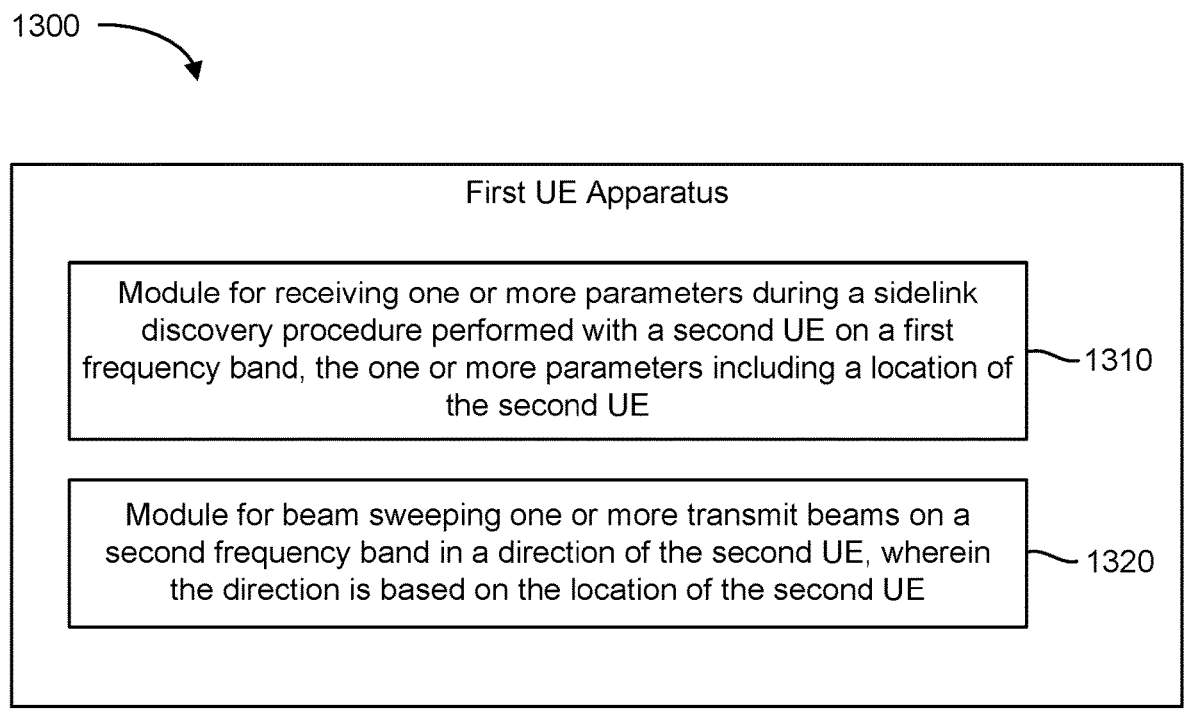

FIG. 13 illustrates an exemplary first UE apparatus 1300 (e.g., any of the UEs described herein) represented as a series of interrelated functional modules, according to aspects of the disclosure. In the illustrated example, a module for receiving 1310 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein. A module for beam sweeping 1320 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein.

Figure 14:
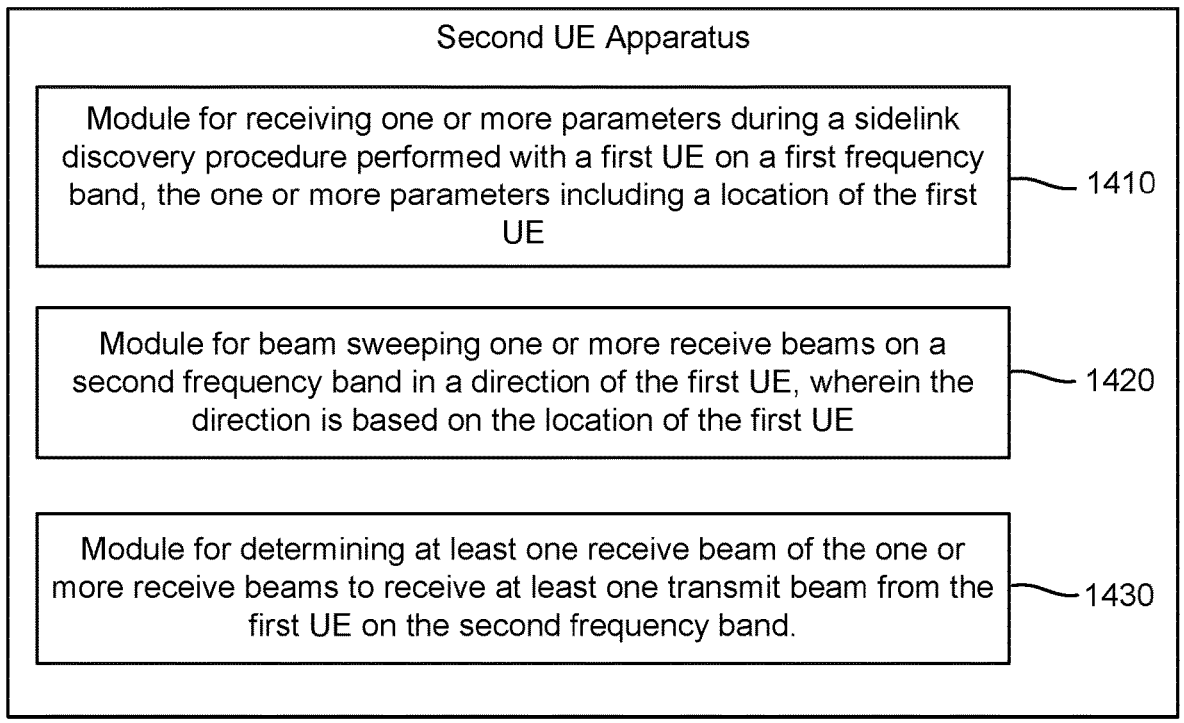

FIG. 14 illustrates an exemplary second UE apparatus 1300 (e.g., any of the UEs described herein) represented as a series of interrelated functional modules, according to aspects of the disclosure. In the illustrated example, a module for receiving 1410 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein. A module for beam sweeping 1420 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein. A module for determining 1430 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein.

Figure 15:
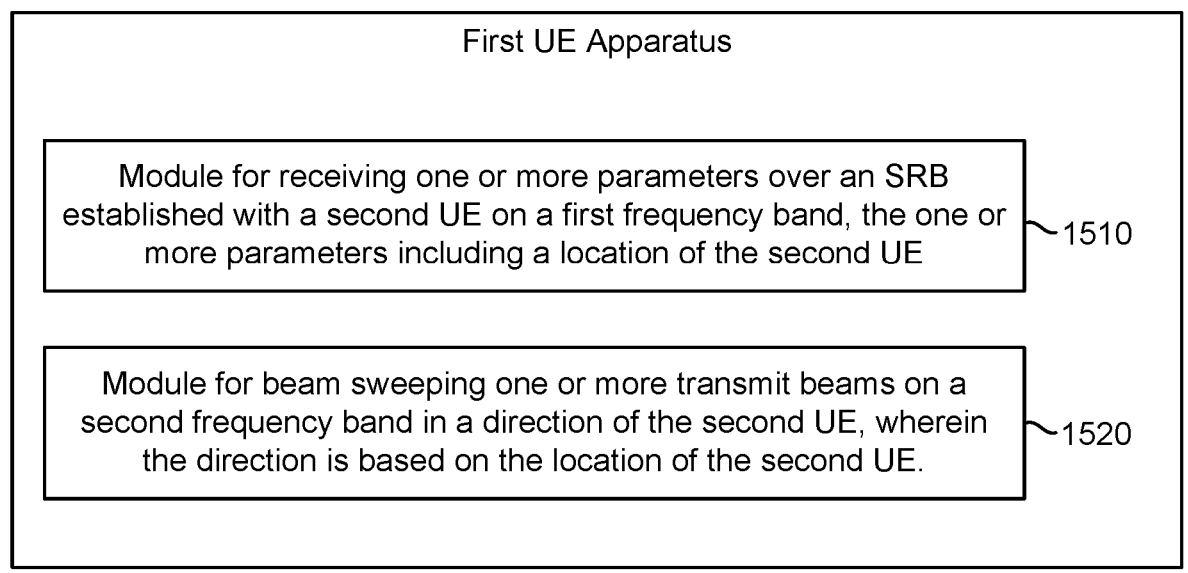

FIG. 15 illustrates an exemplary first UE apparatus 1300 (e.g., any of the UEs described herein) represented as a series of interrelated functional modules, according to aspects of the disclosure. In the illustrated example, a module for receiving 1510 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein. A module for beam sweeping 1520 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein.

Figure 16:
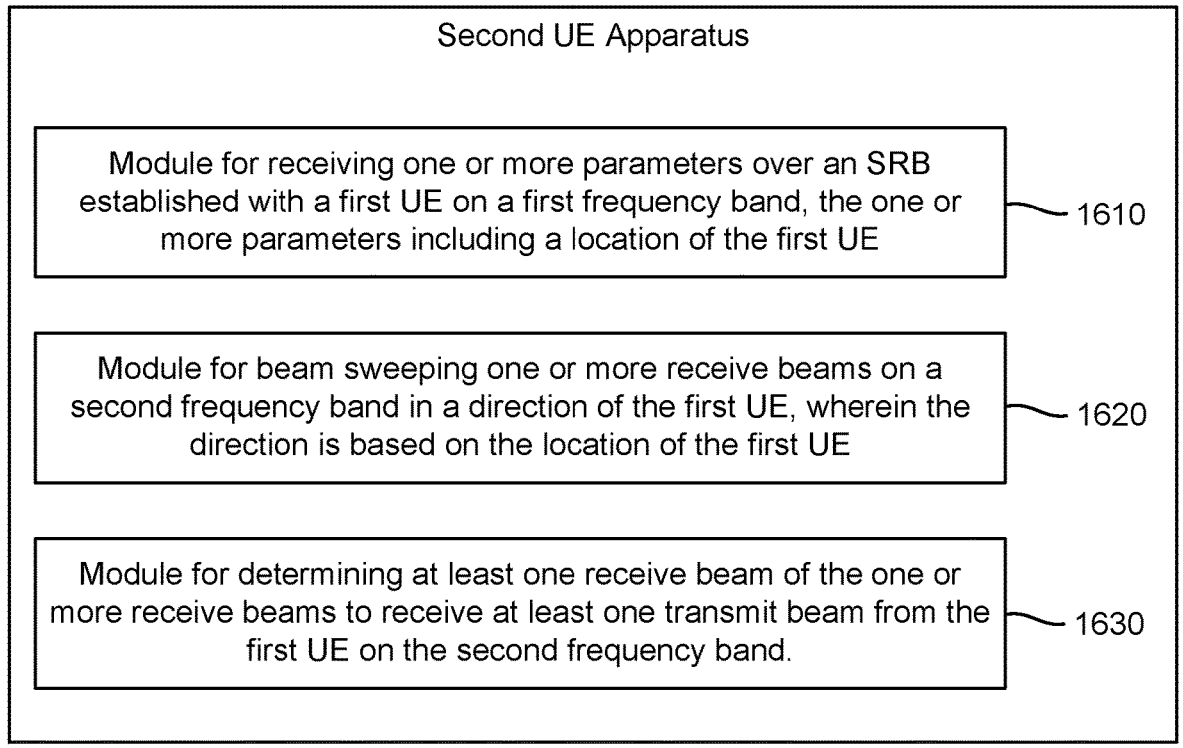

FIG. 16 illustrates an exemplary second UE apparatus 1600 (e.g., any of the UEs described herein) represented as a series of interrelated functional modules, according to aspects of the disclosure. In the illustrated example, a module for receiving 1610 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein. A module for beam sweeping 1620 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein. A module for determining 1630 may correspond to, for example, a communication device (e.g., transceiver(s) 404) and/or a processing system (e.g., processing system 410 and/or sidelink manager 470), optionally in conjunction with a memory (e.g., memory 414 and/or sidelink manager 470), as discussed herein.

The functionality of the modules of FIGS. 13 to 16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 13 to 16, as well as other components and functions described herein, may be implemented using any suitable means. Such means also may be implemented, at least in part, using corresponding structure as taught herein. For example, the components described above in conjunction with the "module for" components of FIGS. 13 to 16 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 13 to 16 may include code for performing a LOAD operation, a COMPARE operation, a RETURN operation, an IF-THEN-ELSE loop, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communication performed at a first user equipment (UE), comprising:
receiving, from a second UE, over a sidelink between the first UE and the second UE, one or more parameters during a sidelink discovery procedure performed with the second UE on a first frequency band, the one or more parameters including a location of the second UE;
beam sweeping one or more transmit beams of a plurality of transmit beams on a second frequency band in a direction of the second UE, wherein the direction is based on the location of the second UE received over the sidelink on the first frequency band; and
receiving a physical random access channel (PRACH) preamble from the second UE on a transmit beam over the second frequency band to permit the second UE to communicate with the first UE over a data radio bearer (DRB) established on a sidelink between the first UE and the second UE on the second frequency band.

2. The method of claim 1, wherein beam sweeping the one or more transmit beams comprises periodically beam sweeping the plurality of transmit beams.

3. The method of claim 1, wherein the one or more parameters further include at least one of a geographic location of the first UE, a geographic location of the second UE, a path of the first UE, a path of the second UE, a given quality of service (QoS) requirement for a data flow over the DRB established on the sidelink between the first UE and the second UE on the second frequency band, directions of the one or more transmit beams, a periodicity of the one or more transmit beams, a frequency of the one or more transmit beams, or a beam response and PRACH combination of the one or more transmit beams.

4. The method of claim 3, wherein the direction from the first UE to the second UE is based at least on the geographic location of the first UE and the geographic location of the second UE.

5. The method of claim 1, wherein the first frequency band comprises an omni-directional frequency band and the second frequency band comprises a frequency band in which a directional beam is used.

6. The method of claim 1, wherein the first UE comprises a first vehicle and the second UE comprises a second vehicle, a roadside object, a roadsign, or a pedestrian.

7. The method of claim 1, wherein the first UE and the second UE communicate over the first frequency band and the second frequency band using a PC5 device-to-device (D2D) interface.

8. The method of claim 1, wherein the first UE transmits physical layer, medium access control (MAC) layer, and other access layer control information for the second frequency band to the second UE over the sidelink between the first UE and the second UE on the first frequency band, and only data flows to the second UE over the DRB established on the sidelink between the first UE and the second UE on the second frequency band.

9. The method of claim 1, further comprising:
receiving, from the second UE, over the sidelink between the first UE and the second UE, capability information indicating an ability of the second UE to simultaneously communicate on the first frequency band and the second frequency band.

10. The method of claim 1, further comprising:
sending, to the second UE, over the sidelink between the first UE and the second UE, capability information indicating an ability of the first UE to simultaneously communicate on the first frequency band and the second frequency band.

11. The method of claim 1, further comprising:
establishing a sidelink unicast connection with the second UE on the sidelink on the first frequency band using a radio resource control (RRC) procedure over a PC5 interface.

12. A method for wireless communication performed at a first user equipment (UE), comprising:

receiving, from a second UE, over a sidelink between the first UE and the second UE, one or more parameters during a sidelink discovery procedure performed with the second UE on a first frequency band, the one or more parameters including a location of the second UE; and beam sweeping one or more transmit beams of a plurality of transmit beams on a second frequency band in a direction of the second UE, wherein the direction is based on the location of the second UE received over the sidelink between the first UE and the second UE on the first frequency band, wherein beam sweeping the one or more transmit beams comprises periodically beam sweeping the plurality of transmit beams, and wherein the first UE uses the plurality of transmit beams to communicate with a plurality of UEs over a corresponding plurality of data radio bearers (DRBs) over respective sidelinks on the second frequency band.

13. The method of claim 12, wherein the first UE prioritizes data transmissions on the plurality of transmit beams based on quality of service (QoS) requirements of the data transmissions on the plurality of transmit beams.

14. The method of claim 1, wherein beam sweeping the one or more transmit beams comprises beam sweeping the one or more transmit beams in response to reception of a request to perform the beam sweeping from the second UE, wherein the request is received over a signaling radio bearer (SRB) on the sidelink between the first UE and the second UE established on the first frequency band.

15. The method of claim 14, wherein the first UE continues a beam sweep of the plurality of transmit beams after beam sweeping the one or more transmit beams.

16. A method for wireless communication performed at a first user equipment (UE), comprising:
receiving, from a second UE, one or more parameters over a signaling radio bearer (SRB) established on a sidelink with the second UE on a first frequency band, the one or more parameters including a location of the second UE;
beam sweeping one or more transmit beams of a plurality of transmit beams on a second frequency band in a direction of the second UE, wherein the direction is based on the location of the second UE received over the SRB on the sidelink with the second UE on the first frequency band; and
receiving a physical random access channel (PRACH) preamble from the second UE on a transmit beam over the second frequency band to permit the second UE to communicate with the first UE over a data radio bearer (DRB) established on a sidelink with the second UE on the second frequency band.

17. The method of claim 16, wherein beam sweeping the one or more transmit beams comprises periodically beam sweeping the plurality of transmit beams.

18. The method of claim 16, wherein beam sweeping the one or more transmit beams comprises beam sweeping the one or more transmit beams in response to reception of a request to perform the beam sweeping from the second UE, wherein the request is received over the SRB on the sidelink with the second UE on the first frequency band.

19. The method of claim 16, wherein the one or more parameters further include a given quality of service (QoS) requirement for a data flow over the DRB established on the sidelink between the first UE and the second UE on the second frequency band.

20. The method of claim 16, wherein the one or more parameters further include a beam response and PRACH combination of the one or more transmit beams.

21. A method for wireless communication performed at a first user equipment (UE), comprising:
receiving, from a second UE, one or more parameters over a signaling radio bearer (SRB) established on a sidelink with the second UE on a first frequency band, the one or more parameters including a location of the second UE;
beam sweeping one or more transmit beams of a plurality of transmit beams on a second frequency band in a direction of the second UE, wherein the direction is based on the location of the second UE received over the SRB on the sidelink with the second UE on the first frequency band; and
transmitting physical layer, medium access control (MAC) layer, and other access layer control information for the second frequency band to the second UE over the first frequency band, and only data flows to the second UE over a data radio bearer (DRB) established between the first UE and the second UE on the second frequency band.

22. A first user equipment (UE) for wireless communication, comprising:
a memory; and
at least one processor coupled to the memory, the at least one processor configured to:
receive, from a second UE, over a sidelink between the first UE and the second UE, one or more parameters during a sidelink discovery procedure performed with the second UE on a first frequency band, the one or more parameters including a location of the second UE;
beam sweep one or more transmit beams of a plurality of transmit beams on a second frequency band in a direction of the second UE, wherein the direction is based on the location of the second UE received over the sidelink on the first frequency band; and
receive a physical random access channel (PRACH) preamble from the second UE on a transmit beam over the second frequency band to permit the second UE to communicate with the first UE over a data radio bearer (DRB) established on a sidelink between the first UE and the second UE on the second frequency band.

23. The first UE of claim 22, wherein in configuring the the at least one processor to beam sweep the one or more transmit beams, the at least one processor is configured to periodically beam sweep the plurality of transmit beams.

24. The first UE of claim 23, the at least one processor further configured to use the plurality of transmit beams to communicate with a plurality of UEs over a corresponding plurality of DRBs over respective sidelinks on the second frequency band.

25. The first UE of claim 24, the at least one processor further configured to prioritize data transmissions on the plurality of transmit beams based on quality of service (QoS) requirements of the data transmissions on the plurality of transmit beams.

26. The first UE of claim 22, wherein the first frequency band comprises an omni-directional frequency band and the second frequency band comprises a frequency band in which a directional beam is used.

27. The first UE of claim 22, wherein the first UE comprises a first vehicle and the second UE comprises a second vehicle, a roadside object, a roadsign, or a pedestrian.

28. The first UE of claim 22, further comprising:
a transceiver coupled to the memory and the at least one processor, the at least one processor further configured to communicate with the second UE over the first frequency band and the second frequency band using a PC5 device-to-device (D2D) interface.

29. A first user equipment (UE) for wireless communication, comprising:
a memory; and
at least one processor coupled to the memory, the at least one processor configured to:
receive, from a second UE, over a sidelink between the first UE and the second UE, one or more parameters during a sidelink discovery procedure performed with the second UE on a first frequency band, the one or more parameters including a location of the second UE; and
beam sweep one or more transmit beams of a plurality of transmit beams on a second frequency band in a direction of the second UE in response to reception of a request to perform the beam sweeping from the second UE, wherein the direction is based on the location of the second UE received over the sidelink on the first frequency band, and wherein the request is received over a signaling radio bearer (SRB) on the sidelink between the first UE and the second UE established on the first frequency band.

30. The first UE of claim 29, the at least one processor further configured to continue a beam sweep of the plurality of transmit beams after beam sweeping the one or more transmit beams.

31. A first user equipment (UE) for wireless communication, comprising:
a memory; and
at least one processor coupled to the memory, the at least one processor configured to:
receive, from a second UE, over a sidelink between the first UE and the second UE, one or more parameters during a sidelink discovery procedure performed with the second UE on a first frequency band, the one or more parameters including a location of the second UE; and
beam sweep one or more transmit beams of a plurality of transmit beams on a second frequency band in a direction of the second UE, wherein the direction is based on the location of the second UE received over the sidelink on the first frequency band,
wherein the one or more parameters further include at least one of a geographic location of the first UE, a geographic location of the second UE, a path of the first UE, a path of the second UE, a given quality of service (QoS) requirement for a data flow over a data radio bearer (DRB) established on a sidelink between the first UE and the second UE on the second frequency band, directions of the one or more transmit beams, a periodicity of the one or more transmit beams, a frequency of the one or more transmit beams, or a beam response and physical random access channel (PRACH) combination of the one or more transmit beams.

32. The first UE of claim 31, wherein the direction from the first UE to the second UE is based at least on the geographic location of the first UE and the geographic location of the second UE.

33. A first user equipment (UE) for wireless communication, comprising:
a memory; and
at least one processor coupled to the memory, the at least one processor configured to:
receive, from a second UE, over a sidelink between the first UE and the second UE, one or more parameters during a sidelink discovery procedure performed with the second UE on a first frequency band, the one or more parameters including a location of the second UE;
beam sweep one or more transmit beams of a plurality of transmit beams on a second frequency band in a direction of the second UE, wherein the direction is based on the location of the second UE received over the sidelink on the first frequency band; and
transmit physical layer, medium access control (MAC) layer, and other access layer control information for the second frequency band to the second UE over the sidelink between the first UE and the second UE on the first frequency band, and only data flows to the second UE over a data radio bearer (DRB) established on a sidelink between the first UE and the second UE on the second frequency band.

34. A non-transitory computer-readable medium storing computer-executable instructions, the computer-executable instructions comprising:
at least one instruction instructing a first user equipment (UE) to receive, from a second UE, over a sidelink between the first UE and the second UE, one or more parameters during a sidelink discovery procedure performed with the second UE on a first frequency band, the one or more parameters including a location of the second UE;
at least one instruction instructing the first UE to beam sweep one or more transmit beams of a plurality of transmit beams on a second frequency band in a direction of the second UE, wherein the direction is based on the location of the second UE received over the sidelink on the first frequency band; and
at least one instruction instructing the first UE to receive a physical random access channel (PRACH) preamble from the second UE on a transmit beam over the second frequency band to permit the second UE to communicate with the first UE over a data radio bearer (DRB) established on a sidelink between the first UE and the second UE on the second frequency band.

35. The non-transitory computer-readable medium of claim 34, wherein the one or more parameters further include at least one of a geographic location of the first UE, a geographic location of the second UE, a path of the first UE, a path of the second UE, a given quality of service (QoS) requirement for a data flow over the DRB established on the sidelink between the first UE and the second UE on the second frequency band, directions of the one or more transmit beams, a periodicity of the one or more transmit beams, a frequency of the one or more transmit beams, or a beam response and PRACH combination of the one or more transmit beams.

36. The non-transitory computer-readable medium of claim 35, wherein the direction from the first UE to the second UE is based at least on the geographic location of the first UE and the geographic location of the second UE.

37. The non-transitory computer-readable medium of claim 34, wherein the first frequency band comprises an omni-directional frequency band and the second frequency band comprises a frequency band in which a directional beam is used.

38. The non-transitory computer-readable medium of claim 34, wherein the first UE comprises a first vehicle and the second UE comprises a second vehicle, a roadside object, a roadsign, or a pedestrian.

39. The non-transitory computer-readable medium of claim 34, the computer-executable instructions further comprising at least one instruction instructing the first UE to communicate with the second UE over the first frequency band and the second frequency band using a PC5 device-to-device (D2D) interface.

40. A non-transitory computer-readable medium storing computer-executable instructions, the computer-executable instructions comprising:
   at least one instruction instructing a first user equipment (UE) to receive, from a second UE, over a sidelink between the first UE and the second UE, one or more parameters during a sidelink discovery procedure performed with the second UE on a first frequency band, the one or more parameters including a location of the second UE; and
   at least one instruction instructing the first UE to beam sweep one or more transmit beams of a plurality of transmit beams on a second frequency band in a direction of the second UE in response to reception of a request to perform the beam sweeping from the second UE, wherein the direction is based on the location of the second UE received over the sidelink on the first frequency band, and wherein the request is received over a signaling radio bearer (SRB) on the sidelink between the first UE and the second UE established on the first frequency band.

41. The non-transitory computer-readable medium of claim 40, the computer-executable instructions further comprising at least one instruction instructing the first UE to continue a beam sweep of the plurality of transmit beams after beam sweeping the one or more transmit beams.

42. A non-transitory computer-readable medium storing computer-executable instructions, the computer-executable instructions comprising:
   at least one instruction instructing a first user equipment (UE) to receive, from a second UE, over a sidelink between the first UE and the second UE, one or more parameters during a sidelink discovery procedure performed with the second UE on a first frequency band, the one or more parameters including a location of the second UE;
   at least one instruction instructing the first UE to beam sweep one or more transmit beams of a plurality of transmit beams on a second frequency band in a direction of the second UE, wherein the direction is based on the location of the second UE received over the sidelink between the first UE and the second UE on the first frequency band; and
   at least one instruction instructing the first UE to transmit physical layer, medium access control (MAC) layer, and other access layer control information for the second frequency band to the second UE over the sidelink between the first UE and the second UE on the first frequency band, and only data flows to the second UE over a data radio bearer (DRB) established on a sidelink between the first UE and the second UE on the second frequency band.

43. A first user equipment (UE) for wireless communication, comprising:
   a memory; and
   at least one processor coupled to the memory, the least one processor configured to:
   receive, from a second UE, one or more parameters over a signaling radio bearer (SRB) established on a sidelink with the second UE on a first frequency band, the one or more parameters including a location of the second UE;
   beam sweep one or more transmit beams of a plurality of transmit beams on a second frequency band in a direction of the second UE, wherein the direction is based on the location of the second UE received over the SRB on the sidelink with the second UE on the first frequency band; and
   receive a physical random access channel (PRACH) preamble from the second UE on a transmit beam over the second frequency band to permit the second UE to communicate with the first UE over a data radio bearer (DRB) established on a sidelink with the second UE on the second frequency band.

44. The first UE of claim 43, wherein in configuring the at least one processor to beam sweep the one or more transmit beams, the at least one processor is configured to beam sweep the one or more transmit beams in response to reception of a request to perform the beam sweeping from the second UE, wherein the request is received over the SRB on the sidelink between with the second UE established on the first frequency band.

45. The first UE of claim 43, further comprising:
   a transceiver coupled to the memory and the at least one processor, the at least one processor further configured to transmit physical layer, medium access control (MAC) layer, and other access layer control information for the second frequency band to the second UE over the SRB on the sidelink with the second UE on the first frequency band, and only data flows to the second UE over the DRB established on the sidelink between the first UE and the second UE on the second frequency band.

46. A non-transitory computer-readable medium storing computer-executable instructions, the computer-executable instructions comprising:
   at least one instruction instructing a first user equipment (UE) to receive, from a second UE, one or more parameters over a signaling radio bearer (SRB) established on a sidelink with the second UE on a first frequency band, the one or more parameters including a location of the second UE;
   at least one instruction instructing the first UE to beam sweep one or more transmit beams of a plurality of transmit beams on a second frequency band in a direction of the second UE, wherein the direction is based on the location of the second UE received over the SRB on the sidelink with the second UE on the first frequency band; and
   at least one instruction instructing the first UE to receive a physical random access channel (PRACH) preamble from the second UE on a transmit beam over the second frequency band to permit the second UE to communicate with the first UE over a data radio bearer (DRB) established on a sidelink between the first UE and the second UE on the second frequency band.

47. The non-transitory computer-readable medium of claim 46, wherein the at least one instruction instructing the first UE to beam sweep the one or more transmit beams comprises at least one instruction instructing the first UE to beam sweep the one or more transmit beams in response to reception of a request to perform the beam sweeping from the second UE, wherein the request is received over the SRB on the sidelink with the second UE established on the first frequency band.

48. The non-transitory computer-readable medium of claim 46, the computer-executable instructions further comprising:
    at least one instruction instructing the first UE to transmit physical layer, medium access control (MAC) layer, and other access layer control information for the second frequency band to the second UE over the SRB on the sidelink with the second UE on the first frequency band, and only data flows to the second UE over the DRB established on the sidelink between the first UE and the second UE on the second frequency band.

* * * * *